United States Patent
Kim et al.

(10) Patent No.: US 12,443,819 B1
(45) Date of Patent: Oct. 14, 2025

(54) INFORMATION CODE CREATING METHOD USING FLUORESCENT SILK AND INFORMATION CODE CREATED THEREBY

(71) Applicants: REPUBLIC OF KOREA (MANAGEMENT: RURAL DEVELOPMENT ADMINISTRATION), Jeonju-si (KR); PURDUE RESEARCH FOUNDATION, West Lafayette, IN (US)

(72) Inventors: Seong Wan Kim, Jeollabuk-do (KR); Kee Young Kim, Jeollabuk-do (KR); Nam Sup Kim, Jeollabuk-do (KR); Seong Ryul Kim, Jeollabuk-do (KR); Sang Kug Kang, Jeollabuk-do (KR); Jong Woo Park, Jeollabuk-do (KR); Chan Young Jung, Jeollabuk-do (KR); Young L. Kim, West Lafayette, IN (US); Jungwoo Leem, West Lafayette, IN (US); Heejae Jeon, Seoul (KR); Sang Mok Park, West Lafayette, IN (US); Yuhyun Ji, Lansdale, PA (US)

(73) Assignees: REPUBLIC OF KOREA (MANAGEMENT: RURAL DEVELOPMENT ADMINISTRATION), Jeollabuk-Do (KR); PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 18/712,306

(22) PCT Filed: Apr. 5, 2023

(86) PCT No.: PCT/KR2023/004628
§ 371 (c)(1),
(2) Date: May 22, 2024

(87) PCT Pub. No.: WO2023/195785
PCT Pub. Date: Oct. 12, 2023

(30) Foreign Application Priority Data

Apr. 7, 2022 (KR) .................. 10-2022-0043657
Jun. 23, 2022 (KR) .................. 10-2022-0076847

(51) Int. Cl.
*G06K 19/06* (2006.01)
*C09D 183/04* (2006.01)

(52) U.S. Cl.
CPC ..... *G06K 19/06046* (2013.01); *C09D 183/04* (2013.01)

(58) Field of Classification Search
CPC .................. G06K 19/06046; C09D 183/04
(Continued)

(56) References Cited

U.S. PATENT DOCUMENTS

2016/0325579 A1  11/2016  Ramesh Sharma et al.
2017/0189557 A1*  7/2017  Park ............. C12N 5/0068
(Continued)

FOREIGN PATENT DOCUMENTS

KR  101640499 B1  7/2016
KR  101655333 B1  9/2016
(Continued)

OTHER PUBLICATIONS

International Search Report for International Application No. PCT/KR2023/004628, Filing Date: Apr. 5, 2023, Date of Mailing: Jul. 10, 2023, 3 pages.
(Continued)

*Primary Examiner* — Daniel A Hess
(74) *Attorney, Agent, or Firm* — CANTOR COLBURN LLP

(57) ABSTRACT

A method for creating an information code configured by a silk film includes a process of creating a white silk film: a
(Continued)

process of creating a micro-grating pattern on the white silk film, and a process of coating the white silk film with each of the plurality of fluorescent silk solutions in a corresponding position of the information code and the information code is configured by a color corresponding to each of the plurality of fluorescent silk solutions and a white color.

9 Claims, 20 Drawing Sheets

Specification includes a Sequence Listing.

(58) Field of Classification Search
USPC .......................................................... 235/494
See application file for complete search history.

(56) References Cited

U.S. PATENT DOCUMENTS

| | | | |
|---|---|---|---|
| 2020/0306411 | A1 | 10/2020 | Atlas et al. |
| 2024/0127614 | A1* | 4/2024 | Kim .................. G06V 20/95 |
| 2024/0146547 | A1* | 5/2024 | Kim .................. H04L 9/0866 |

FOREIGN PATENT DOCUMENTS

| | | |
|---|---|---|
| KR | 1020180031875 A | 3/2018 |
| KR | 1020190011234 A | 2/2019 |

OTHER PUBLICATIONS

Gu, X. et al.; "Pure-silk fibroin hydrogel with stable aligned micropattern toward peripheral nerve regeneration"; Nanotechnology Reviews, vol. 10, Issue No. 1; pp. 10-19; DOI: 10.1515/ntrev-2021-0002 (2021).

Leem, J. et al.; "Edible unclonable functions"; Nature Communications, vol. 11; Article No. 328; 11 pages; DOI: 10.1038/s41467-019-14066-5 (2020).

* cited by examiner

<FIG. 1A>
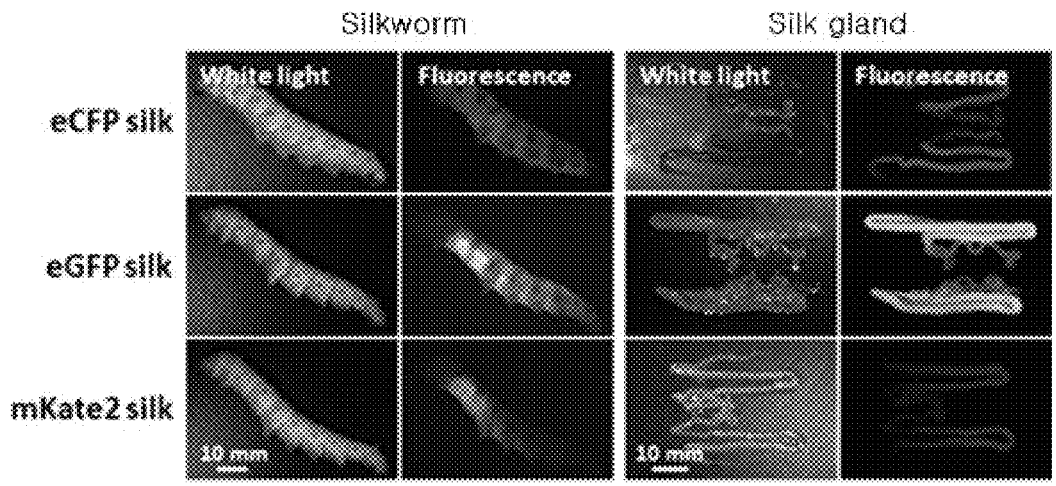
<FIG. 1B>
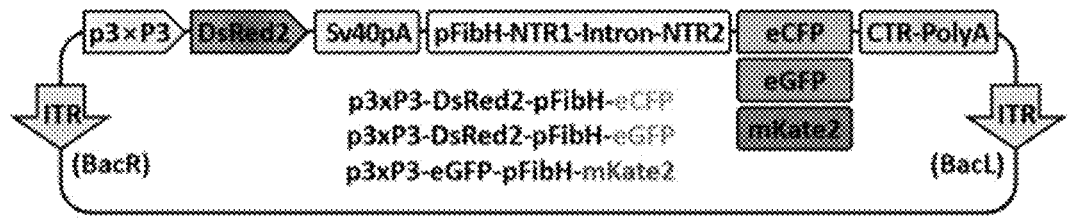
<FIG. 1C>
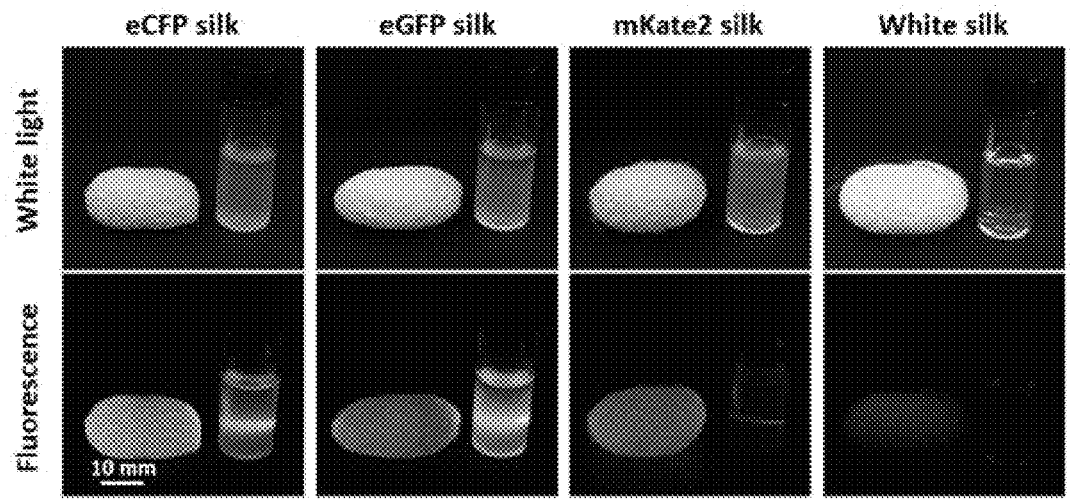

<FIG. 1D>
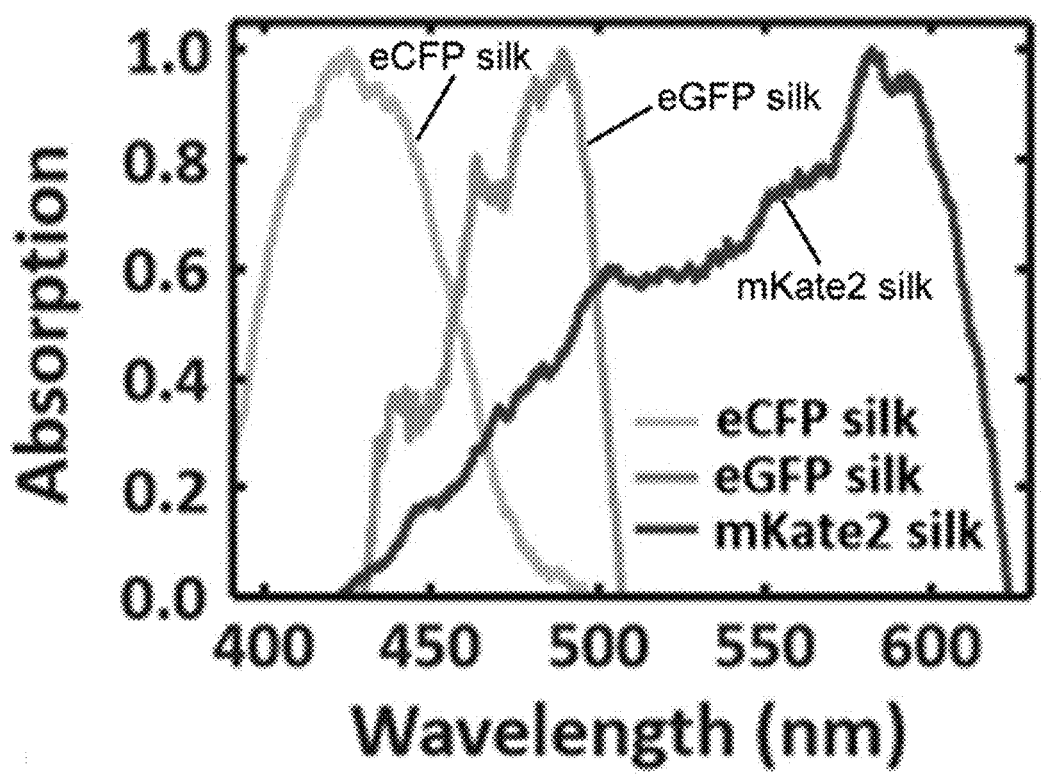

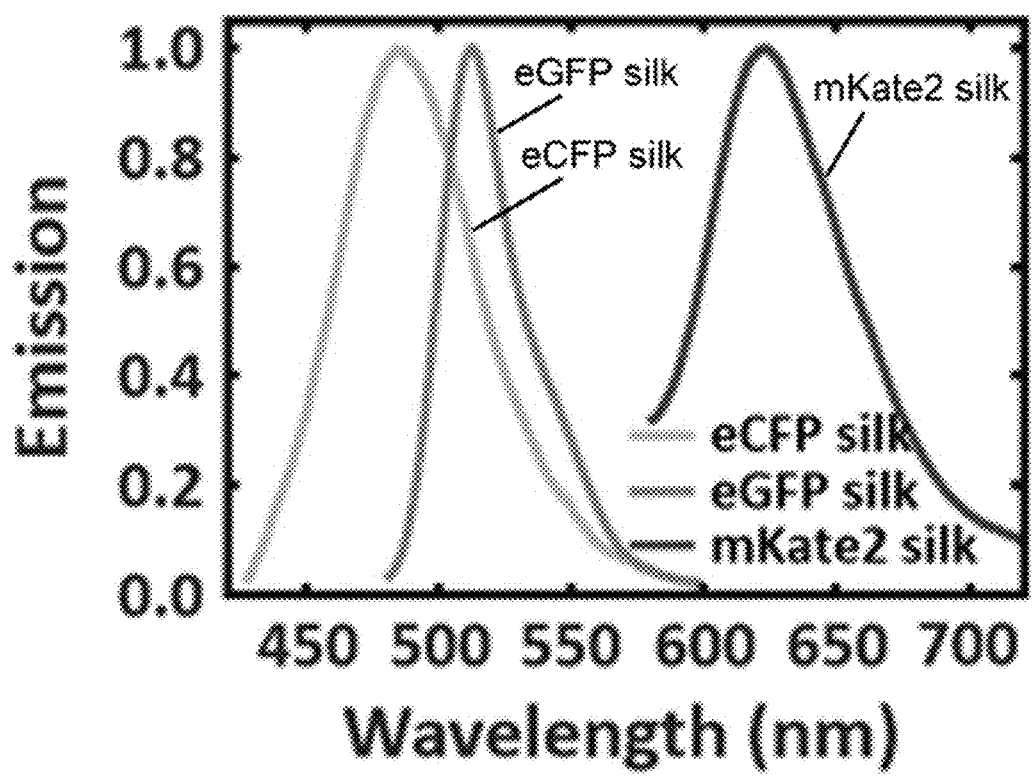
<FIG. 1E>

<FIG. 1F>
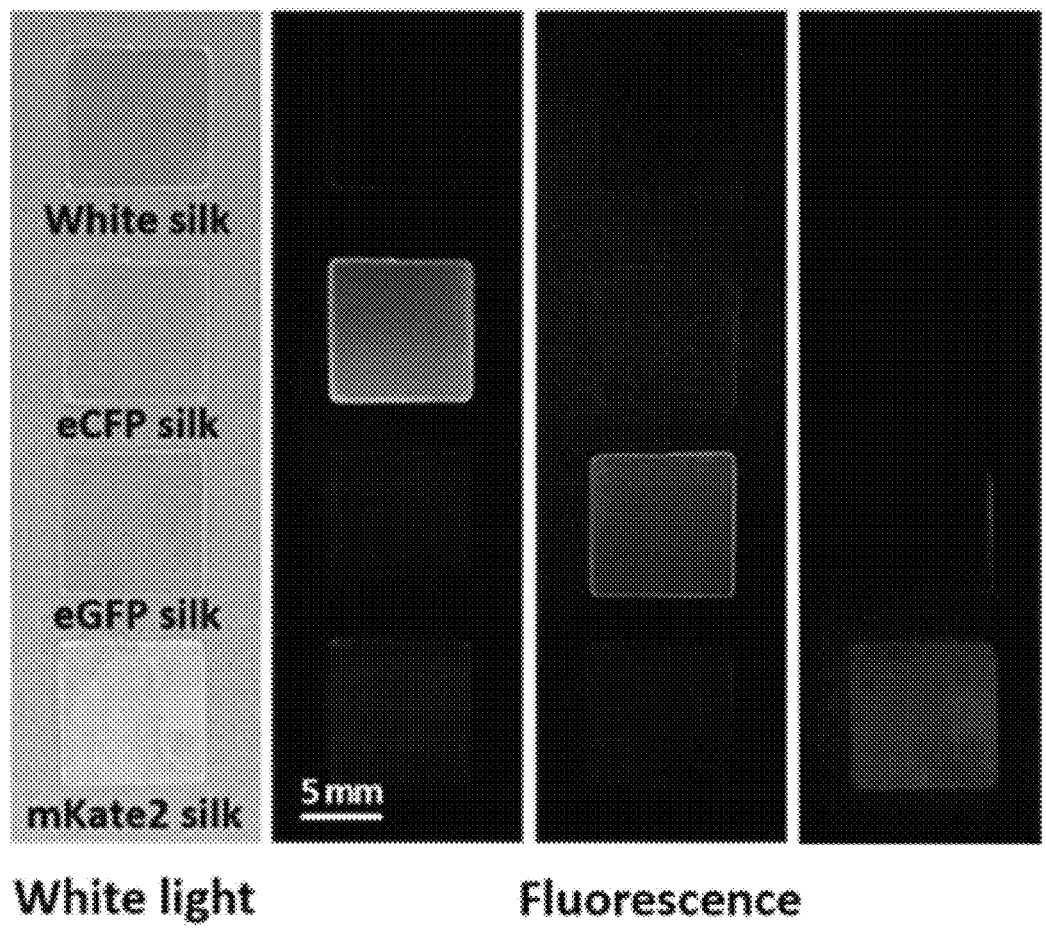
<FIG. 1G>
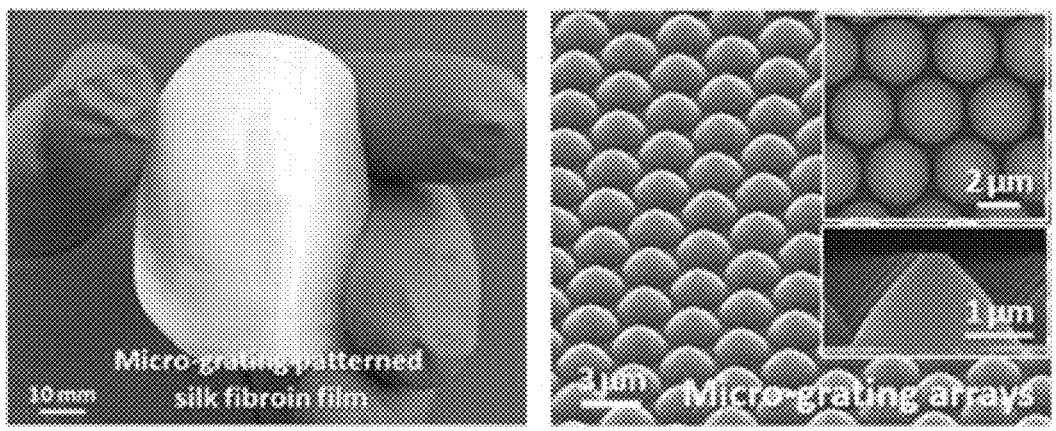

<FIG. 1H>
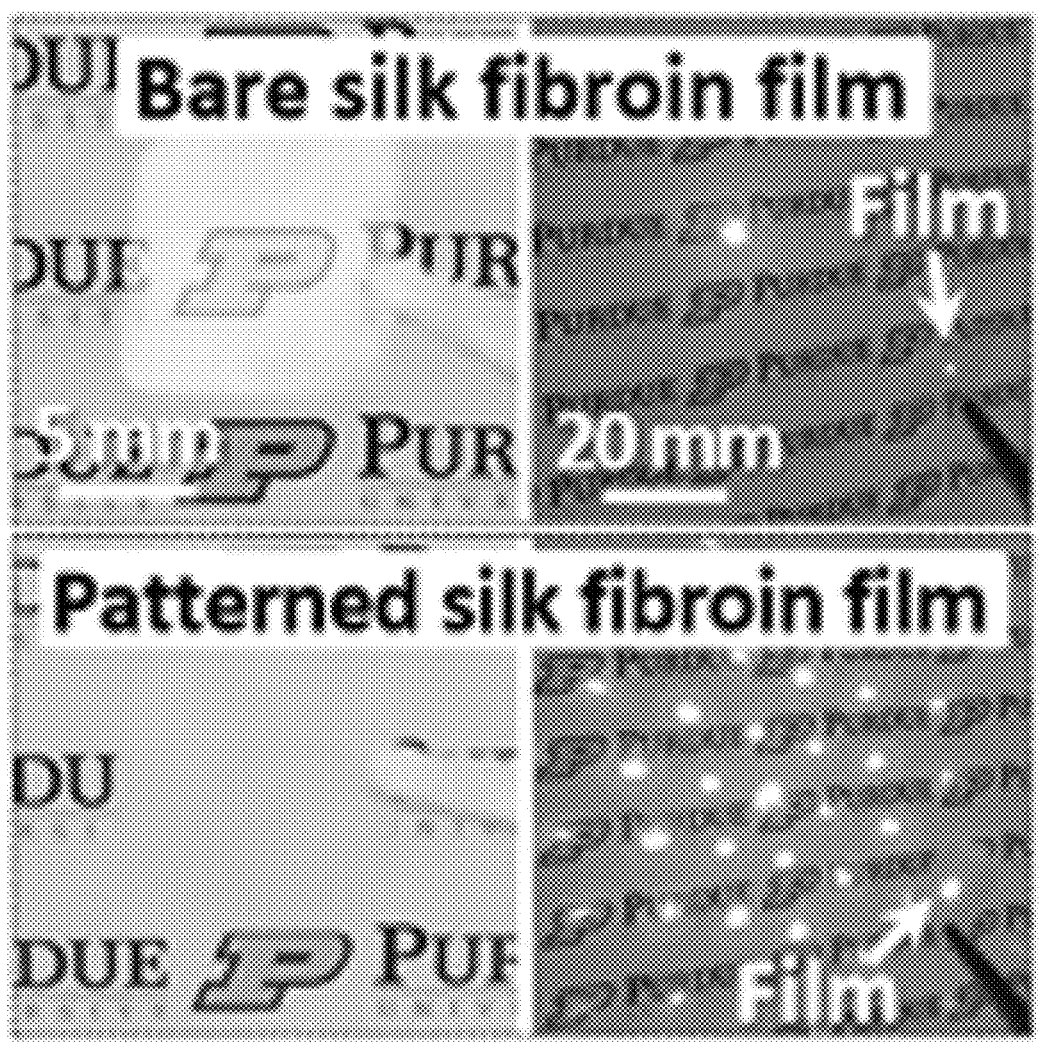

<FIG. 1I>
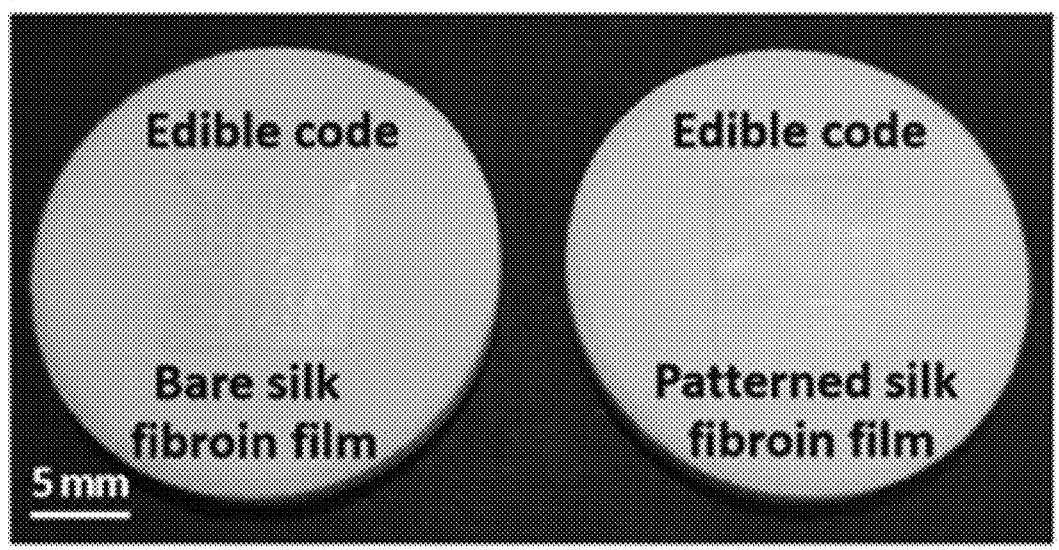

<FIG. 1J>
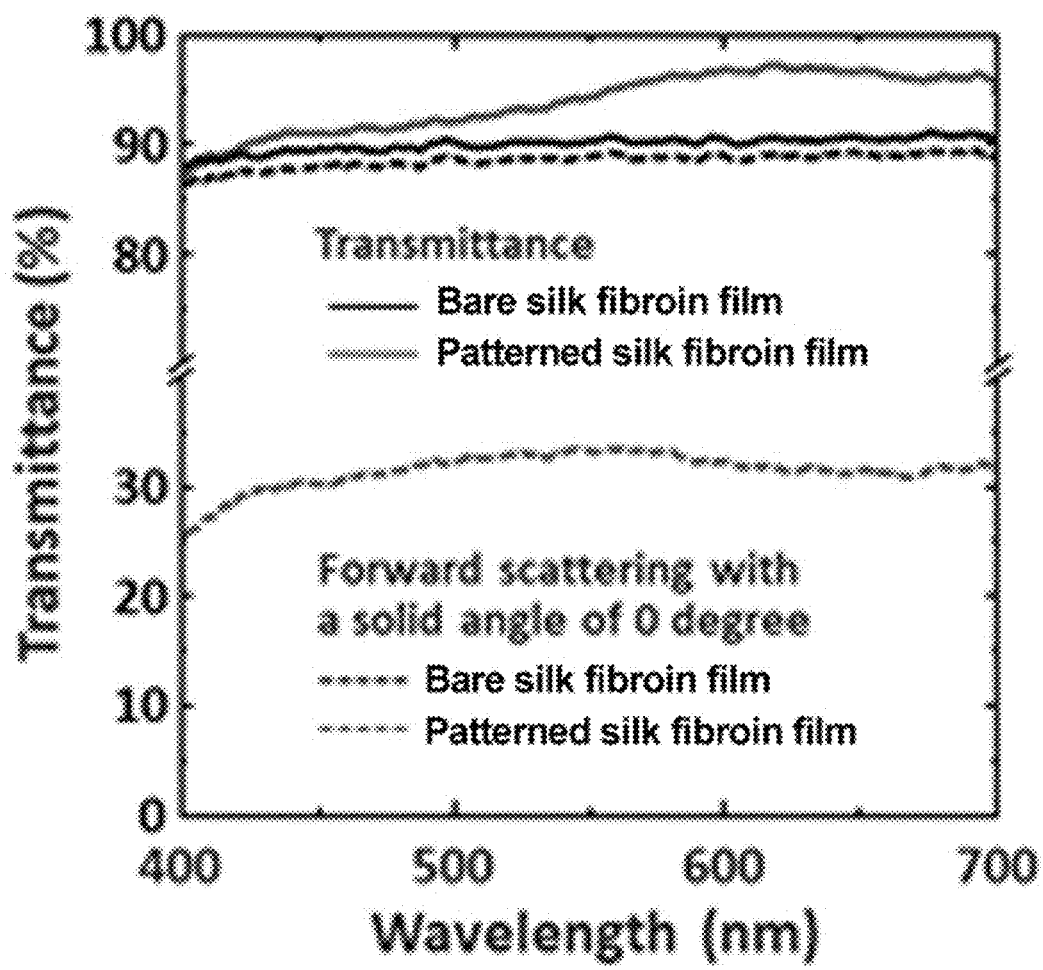
<FIG. 1K>
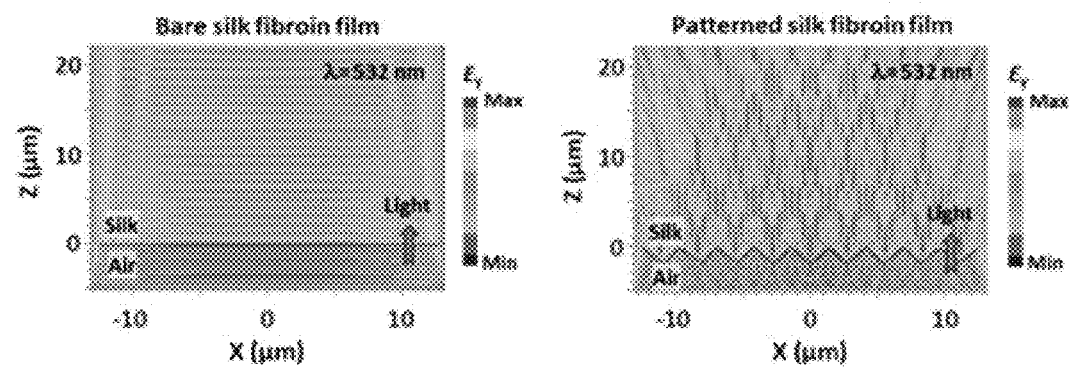

<FIG. 2A>
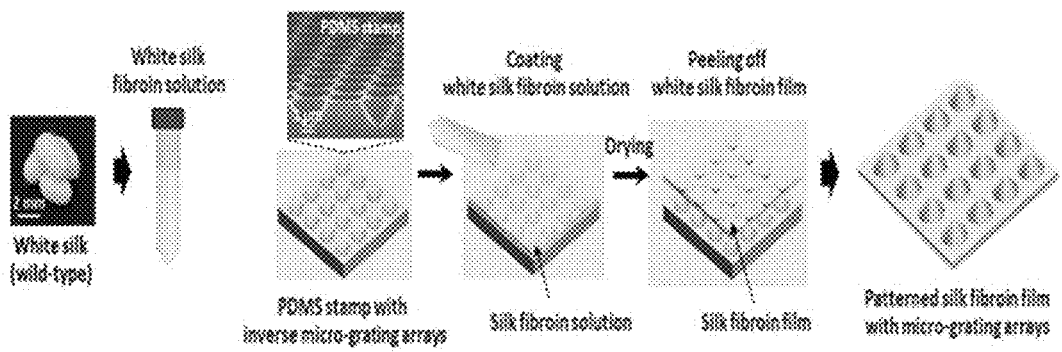
<FIG. 2B>
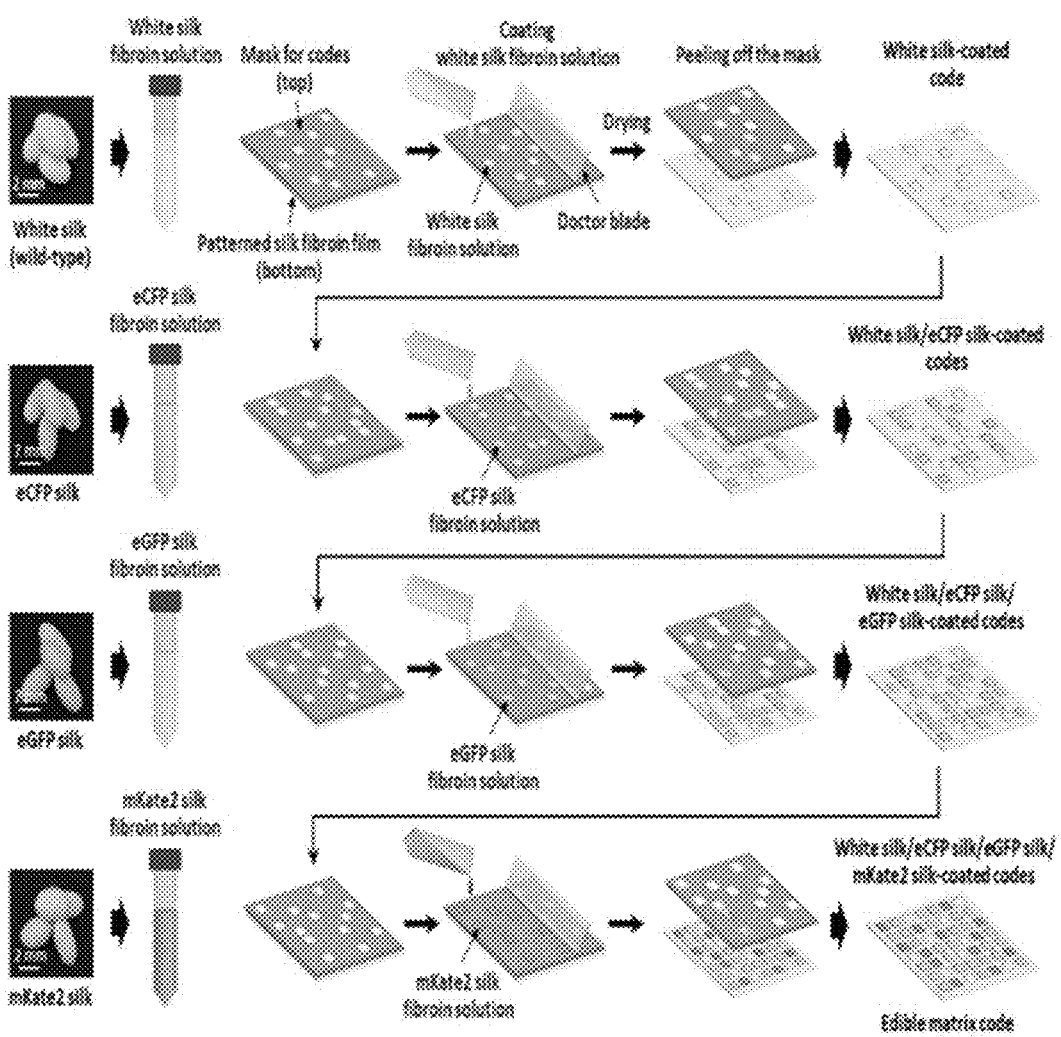

<FIG. 2C>
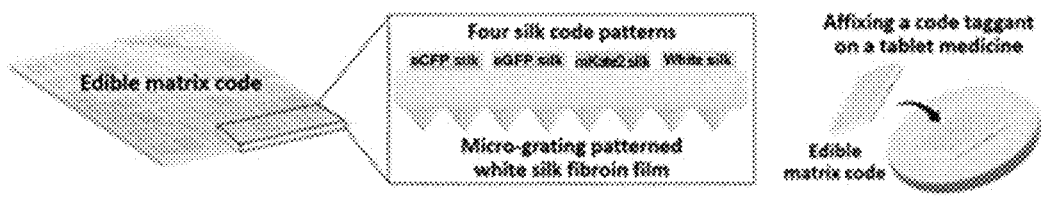
<FIG. 2D>
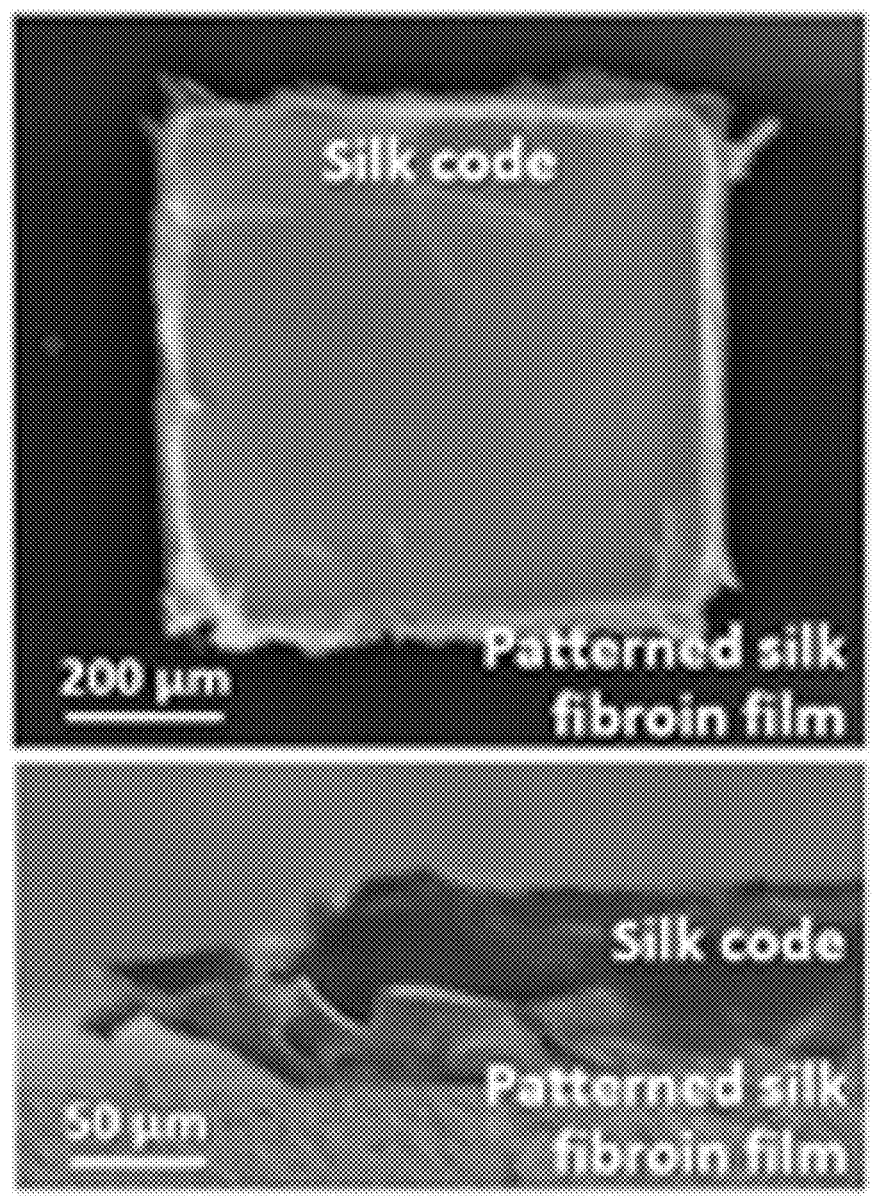

<FIG. 2E>
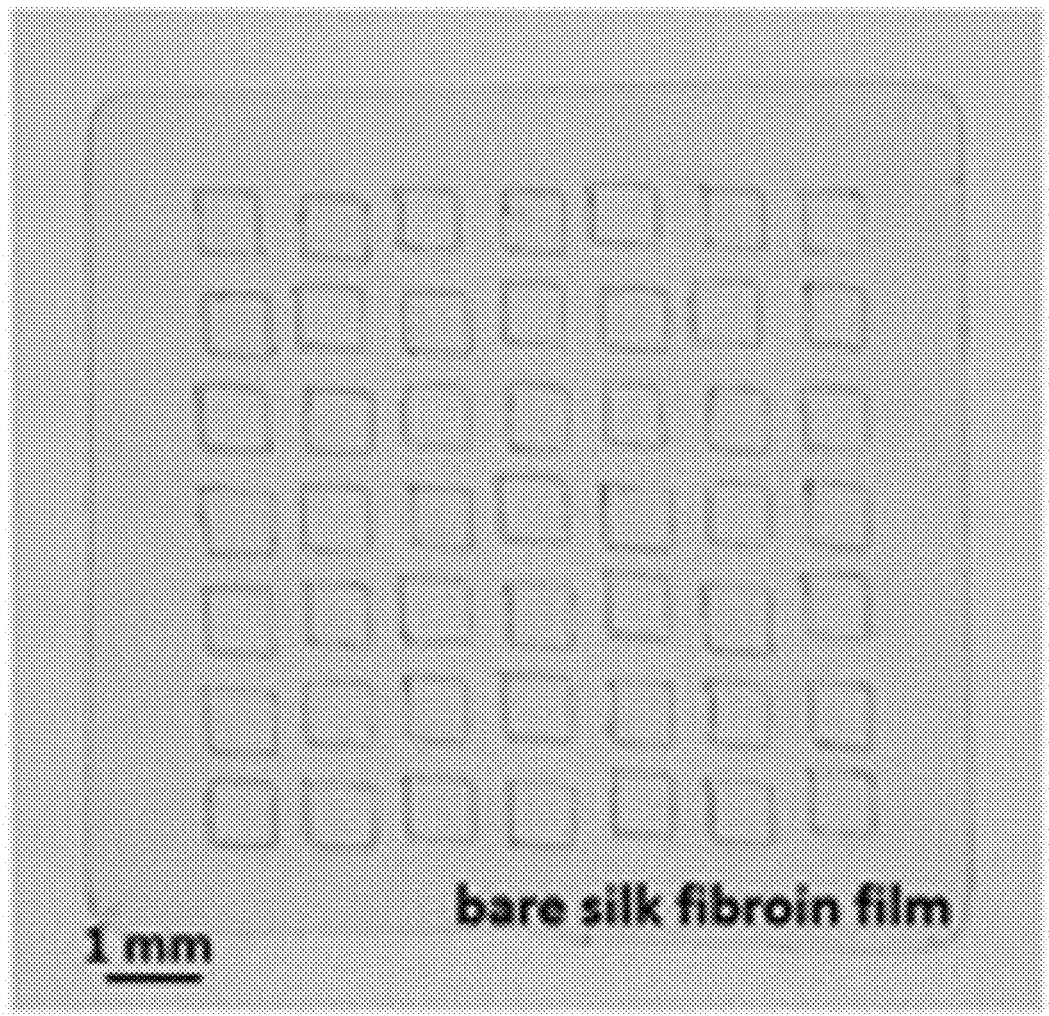
<FIG. 2F>
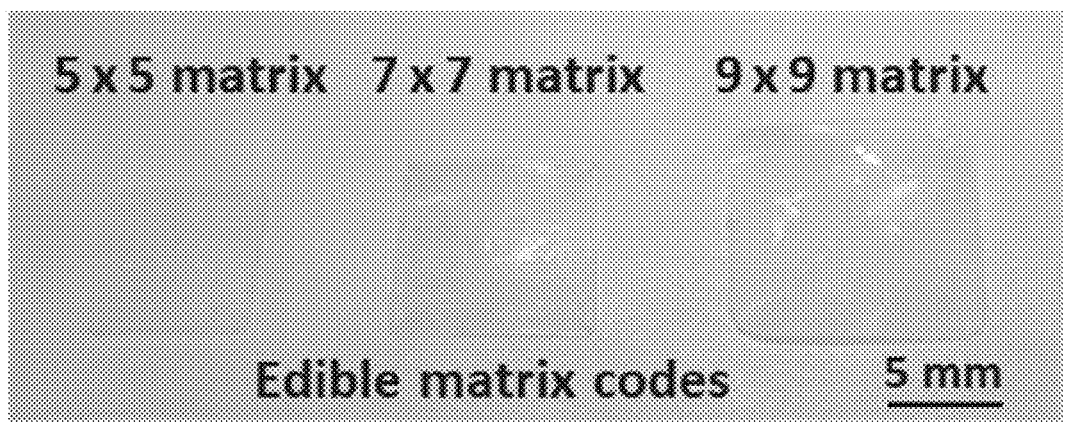

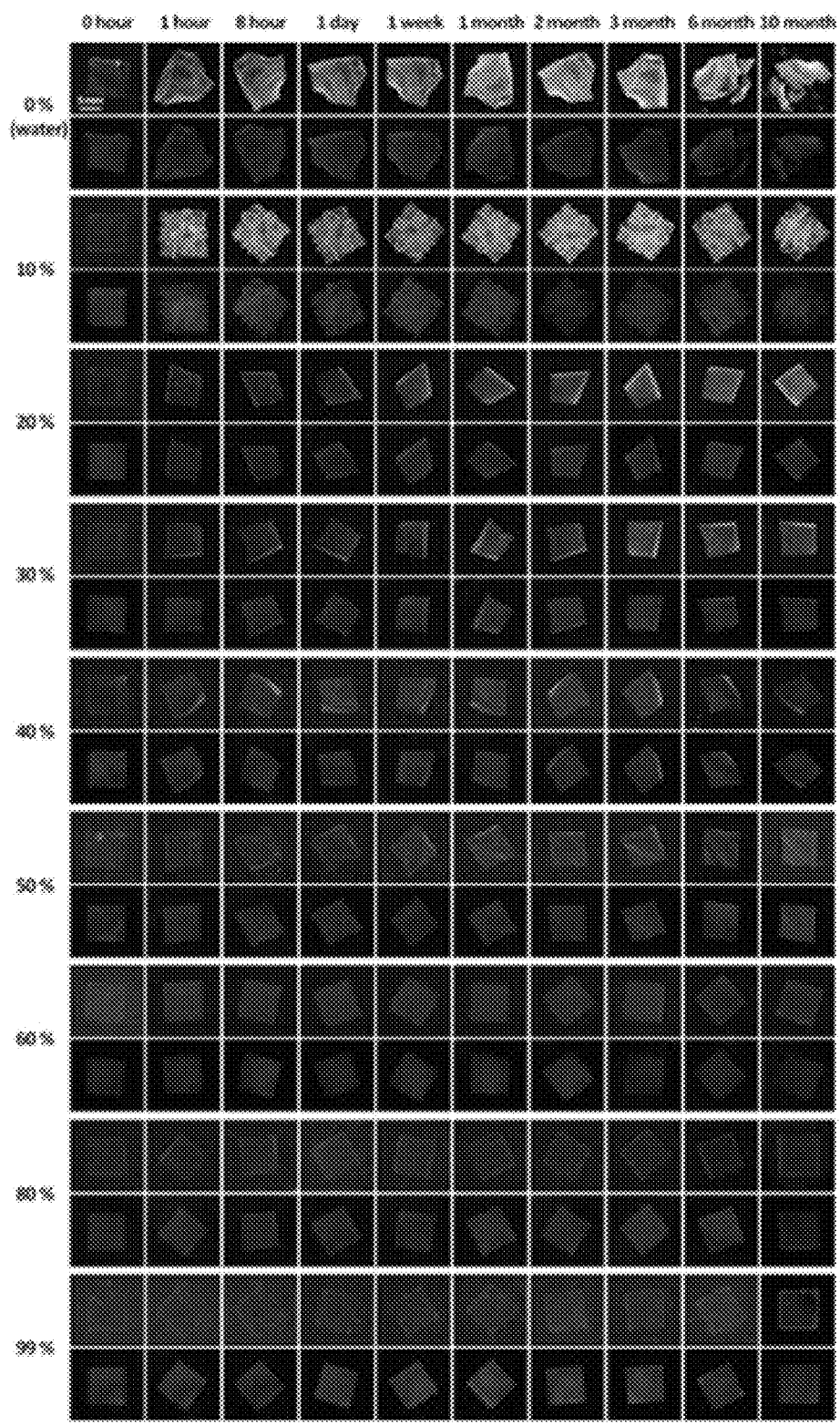
<FIG. 3>

<FIG. 4>
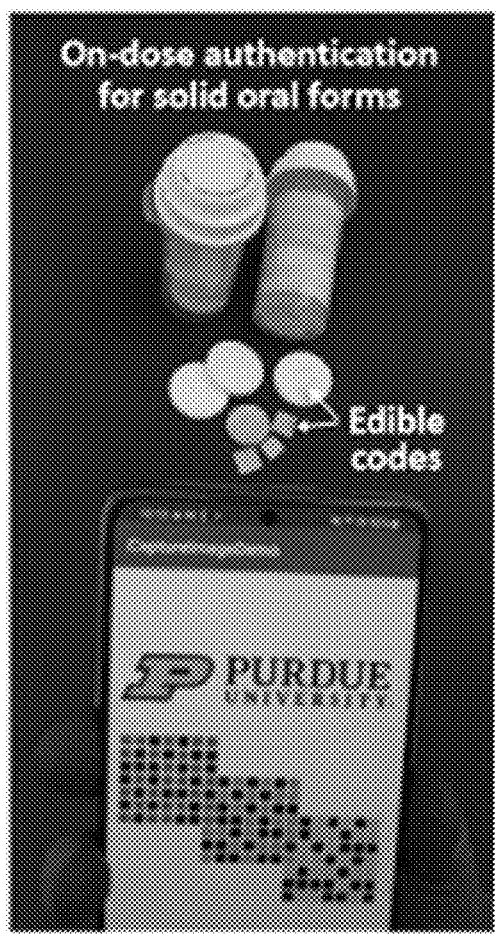
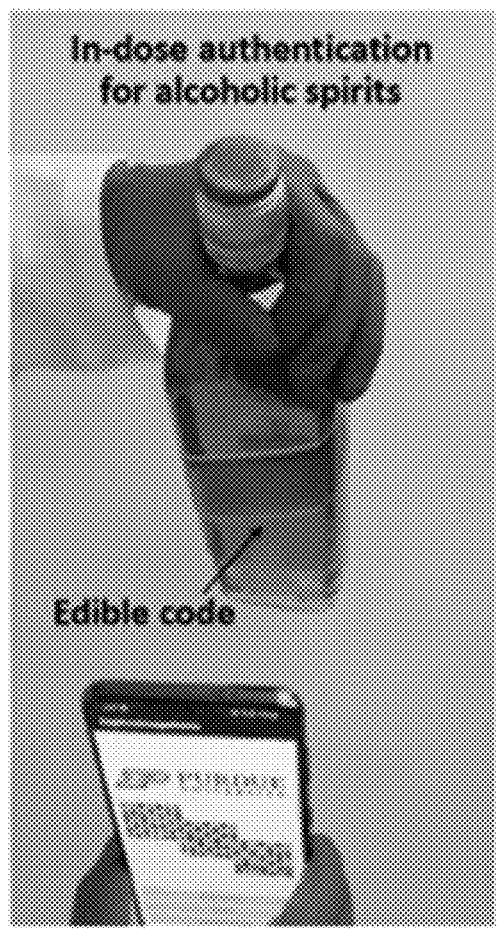

<FIG. 5A>
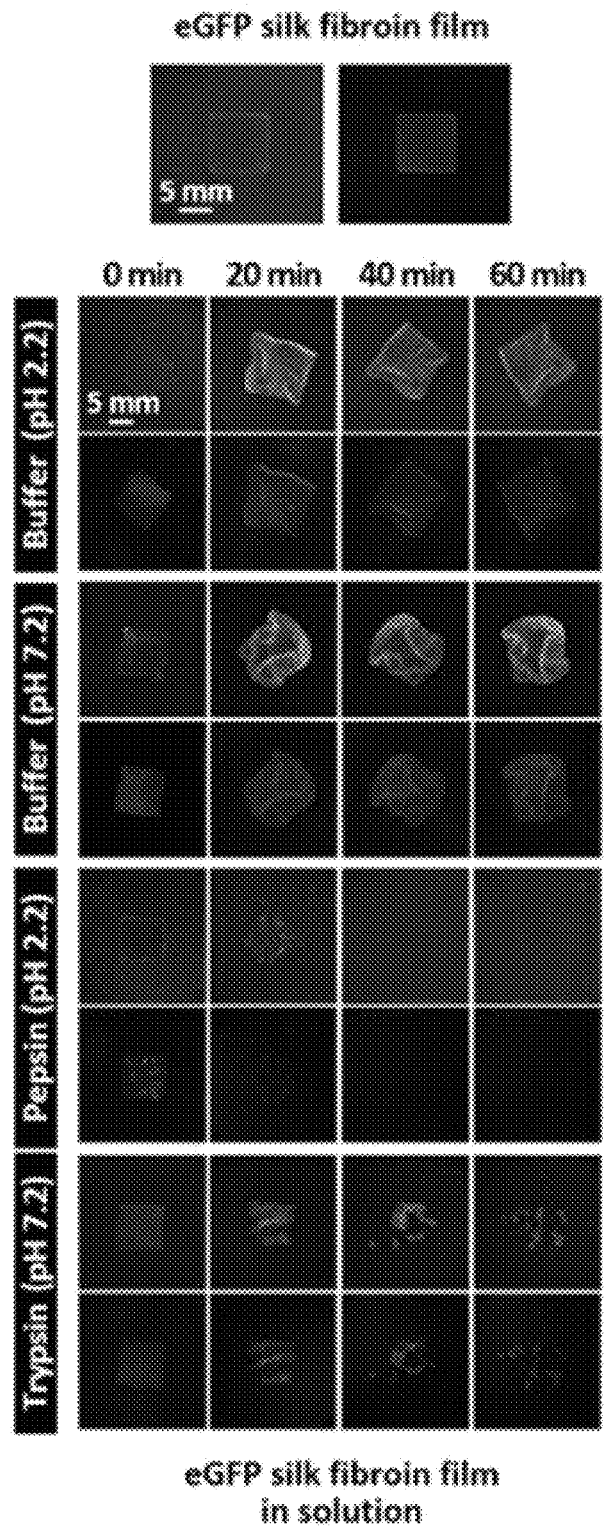

<FIG. 5B>
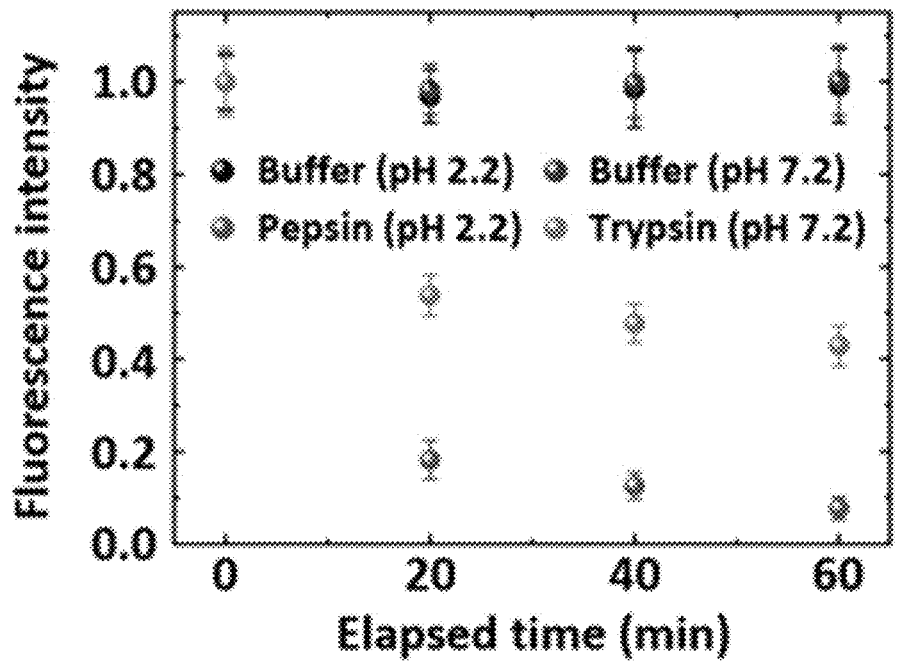
<FIG. 5C>
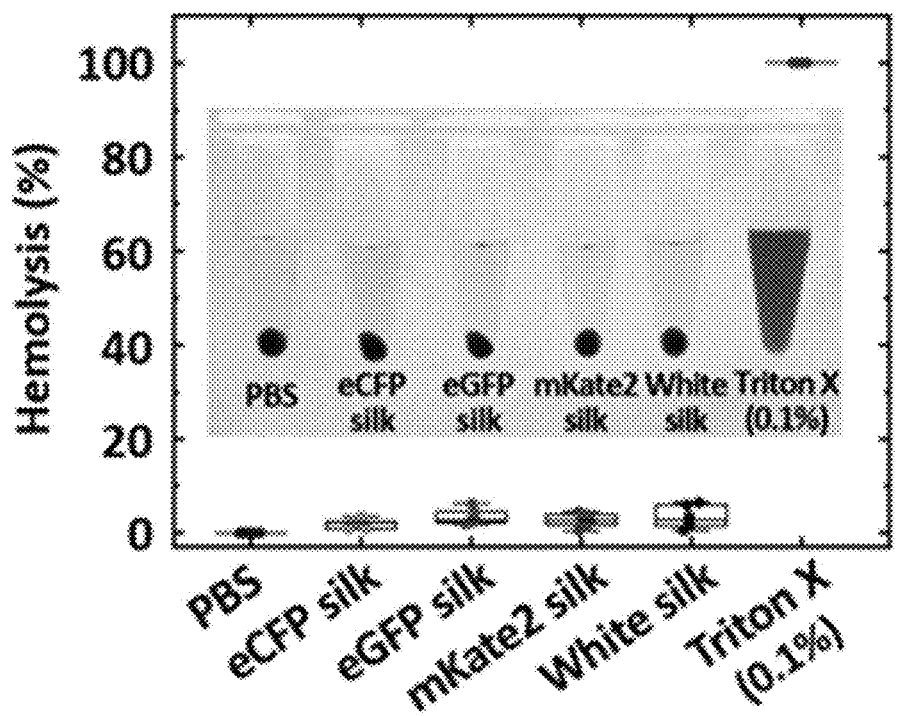

<FIG. 6A>
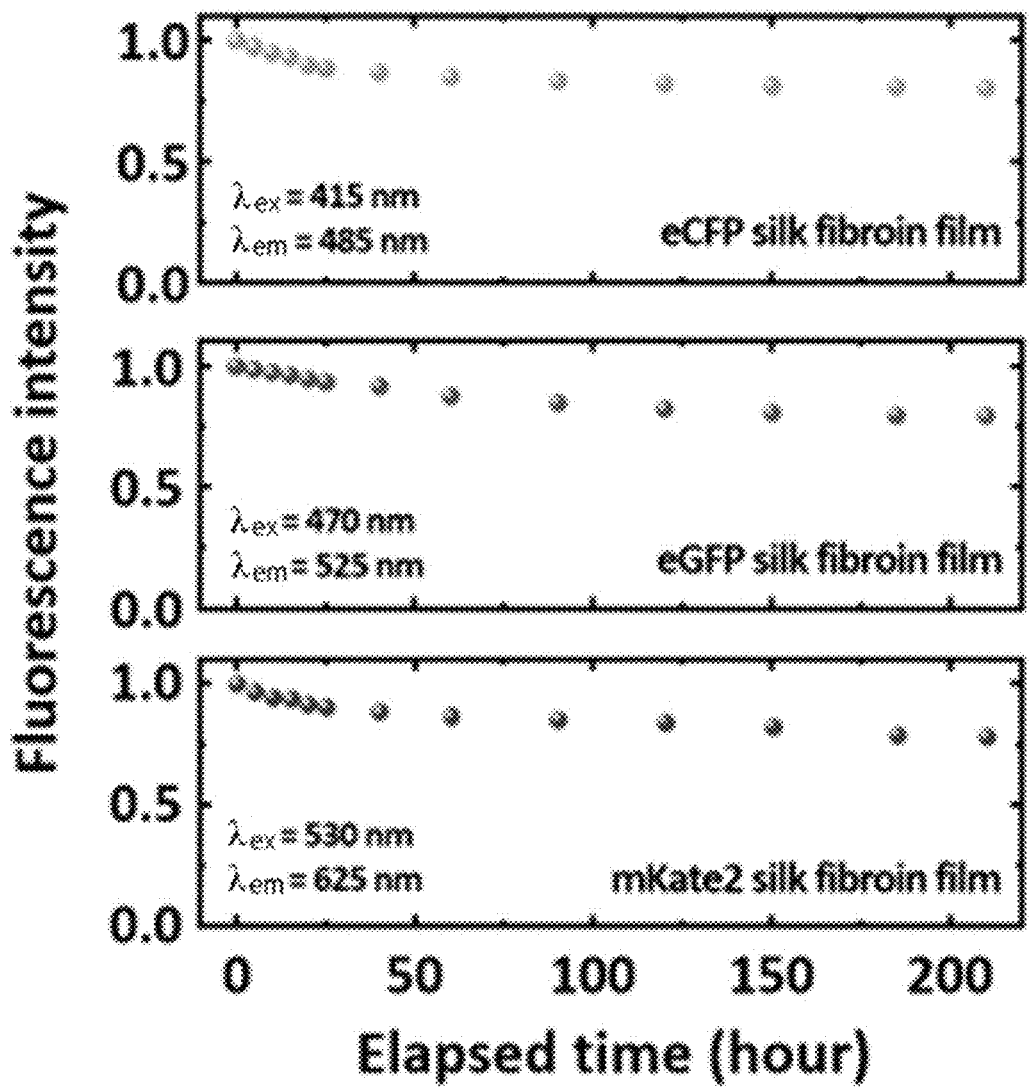

<FIG. 6B>
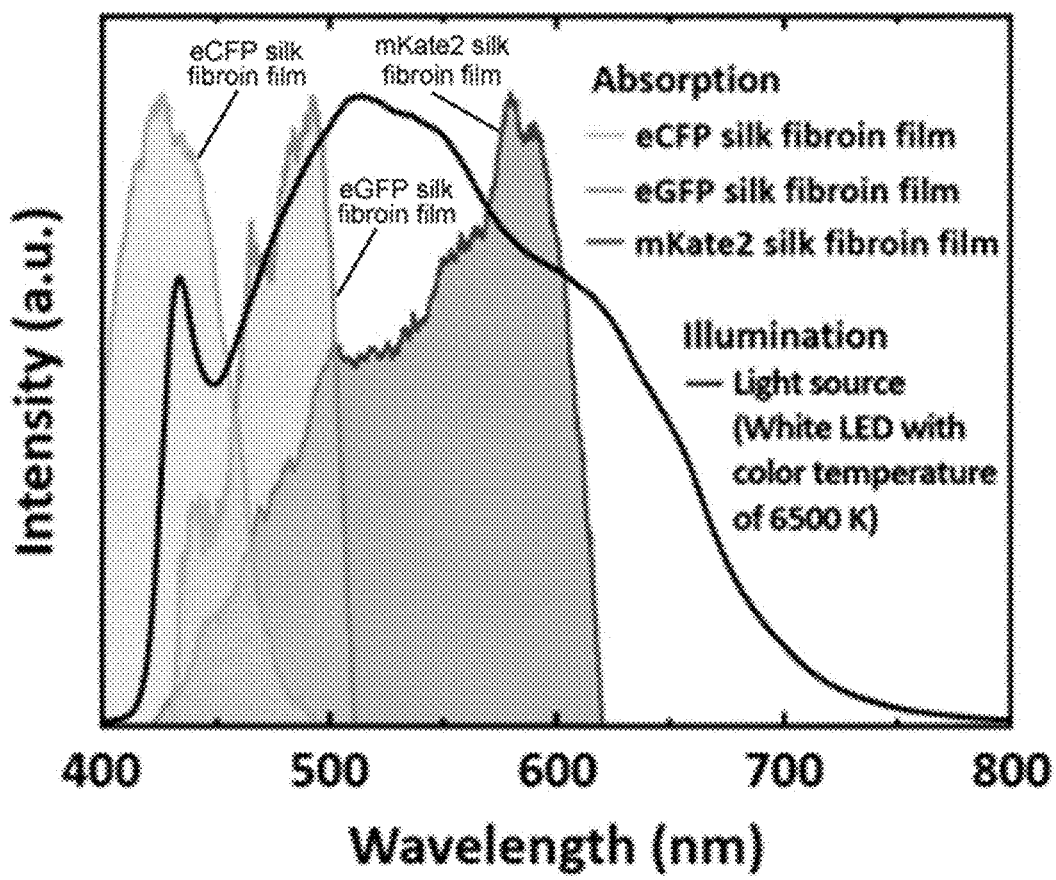

<FIG. 7A>
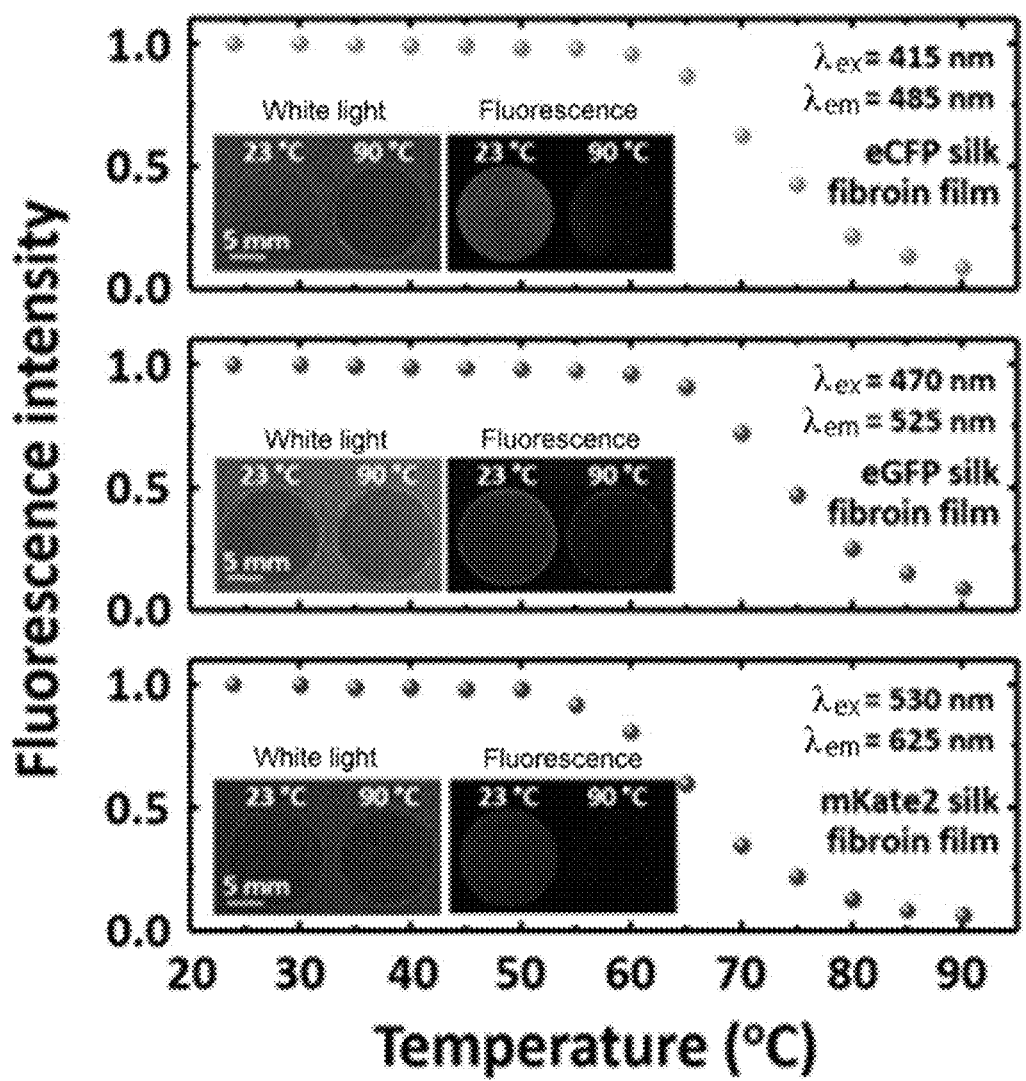

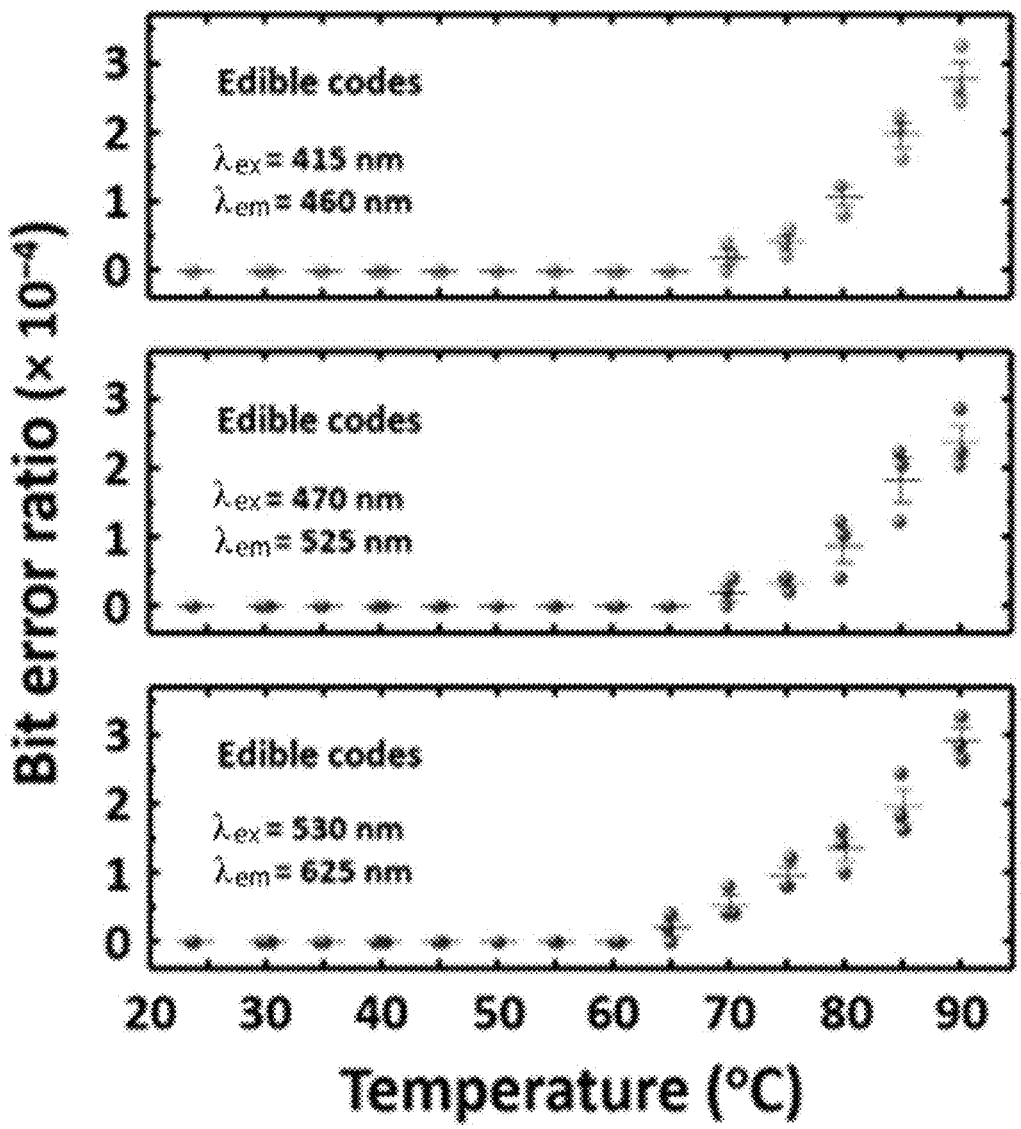
<FIG. 7B>

<FIG. 8A>
Raw fluorescence input image
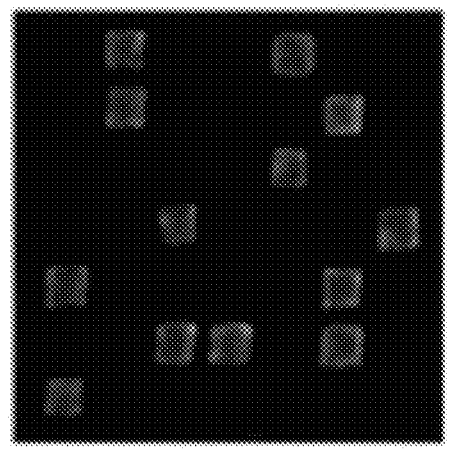
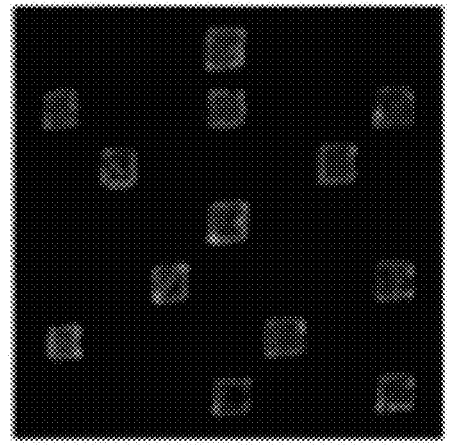
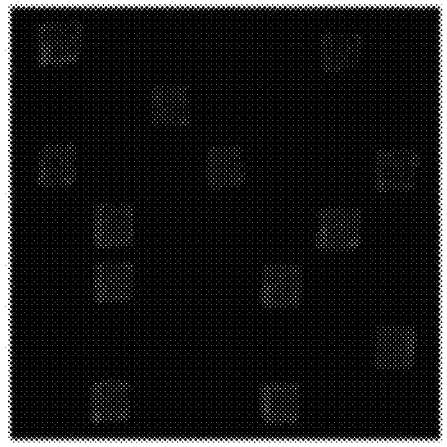

<FIG. 8B>
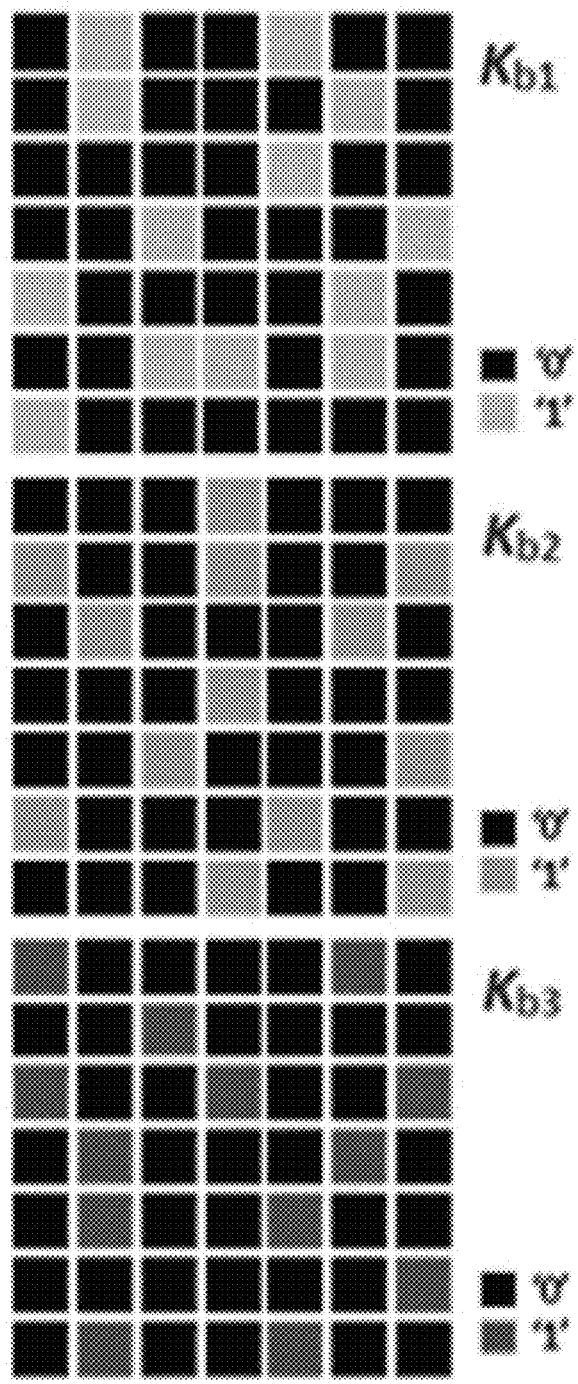

INFORMATION CODE CREATING METHOD USING FLUORESCENT SILK AND INFORMATION CODE CREATED THEREBY

CROSS REFERENCE TO RELATED APPLICATIONS

This application is a U.S. National Stage Application of PCT/KR2023/004628, filed Apr. 5, 2023, which claims the benefit of priority to Korean Application Nos. 10-2022-0043657 filed Apr. 7, 2022 and 10-2022-0076847 filed Jun. 23, 2022, all of which are incorporated by reference in their entireties herein.

SEQUENCE LISTING

The Instant Application contains a Sequence Listing which has been submitted electronically in XML format and is hereby incorporated by reference in its entirety. Said XML copy, created on Nov. 15, 2024, is named "JNU0010US" and is 9,628 bytes in size. The Sequence Listing does not go beyond the disclosure in the application as filed.

TECHNICAL FIELD

The present invention relates to an information code creating method using a fluorescent silk and an information code created thereby, and more particularly, to a method for creating an information code using a fluorescent silk and an information code created thereby.

BACKGROUND ART

Generally, in order to protect brands and certify the integrity of products, a method of attaching information codes, such as barcodes, QR (quick response) codes, or holograms, onto products or packages is being used. In the case of foods or medicine, most of the materials which configure the information code may cause toxicity to the human body so that the information code is mainly represented on the package for certification rather than labeling the food or medicine with the information code. However, a package-level certification technique is easy to copy, forge, and/or alter to be vulnerable to security. Recently, techniques are being developed to introduce the certification method to the medicine itself rather than the packaging level. For example, QR code drug labels, silica microtaggant, DNA taggant, polymer molecule encoding, isotope-labeled excipient, multi-color nonpareil coating, watermark bioprinting, and metal nanoparticle taggant are being used as all-in-one information code of medicines. Further, various fluorescent materials including barcode microfibers using coumarin-6, rhodamine B dye microtaggants in polyethylene glycol, QR code capsules using upconverting fluorescent nanoparticles, dextran-modified 2-hydroxyethylmethacrylate polymer particles, and lysozyme supramolecular nanofilms are also actively used as materials for information codes with their unique optical properties to prevent counterfeit medicines. However, the exogenous and artificial additive materials used for the information code may cause potentially hazardous and harmful (for example, carcinogenic and cytotoxic) consequences so that it is necessary to develop information codes which are safer for the human body and have a higher security.

In order to prevent the distribution of counterfeit/altered drugs, in the United States, products should be traceable to the product unit level by 2023 according to the Drug Supply Chain Security Act and in Europe, a product safety function needs to be implemented according to the Falsified Medicines Directive. As a result, major pharmaceutical manufacturers, distributors, and retailers in the United States have recently created blockchain-based solutions for supply chain management (also known as a MediLedger network).

DISCLOSURE

Technical Problem

Until today, technologies using tags or labels attached onto the packages are mainly used to certificate the genuine food or medicine. However, the package level certification technologies are easily copied, counterfeited, or altered. Further, the counterfeit/altered food or medicine is sold mainly through online, rather than offline so that it is difficult to crack down on them.

Food and medicine are directly related to the health and safety of users (consumers) so that the damage may be larger than the other counterfeit/altered products. For example, when the counterfeit/altered medicines are administrated to patients, the patients may suffer health deterioration or in severe cases, may die. This can erode trust in both the medicines and manufacturers may also be lost, leading to significant economic losses for the pharmaceutical industry. Therefore, various methods for preventing counterfeit/altered food or medicine are being studied.

In order to solve the above-mentioned problems, the present invention proposes a method for creating an information code which may be directly attached onto the food or the medicine or can be taken together and an information code created thereby.

Technical Solution

A method for creating an information code configured by a silk film according to the present invention includes a process of creating a white silk film: a process of coating the white silk film with each of the plurality of fluorescent silk solutions in a corresponding position of the information code and the information code may be configured by a color corresponding to each of the plurality of fluorescent silk solutions and a white color.

In the method for creating an information code configured by a silk film according to the present invention, the white silk film may be a white silk film with a grating pattern.

In the method for creating an information code configured by a silk film according to the present invention, the process of creating a white silk film includes a process of coating a polydimethylsiloxane (PDMS) stamp having a grating pattern with a white silk solution; a process of drying the coated white silk solution; and a process of separating the dried white silk film from the PDMS stamp.

In the method for creating an information code configured by a silk film according to the present invention, the process of coating the white silk film with each of a plurality of fluorescent silk solutions may include: a first process of covering the white silk film with a mask corresponding to one of the plurality of fluorescent silk solutions; a second process of coating the white silk film with one fluorescent silk solution of the plurality of fluorescent silk solutions; a third process of drying the coated fluorescent silk solution; a fourth process of separating the mask from the dried fluorescent silk film; and a process of performing the first to fourth processes on each of the plurality of fluorescent silk solutions.

A method for creating an information code configured by a silk film according to the present invention may further include a process of coating a white silk solution in a corresponding position of the information code.

In the method for creating an information code configured by a silk film according to the present invention, each fluorescent silk solution may be a solution created by cutting each fluorescent silk to a predetermined size, stirring the cut silk pieces at a predetermined speed to be dissolved in an aqueous solution including a dissolving agent at a predetermined temperature for a predetermined time.

In the method for creating an information code configured by a silk film according to the present invention, each fluorescent silk solution may be a solution created by filtering the dissolved solution using a miracloth filter and exchanging deionized water several times while dialyzing into a cellulose semipermeable tube to adjust the fluorescent silk solution to a predetermined concentration.

In the method for creating an information code configured by a silk film according to the present invention, the plurality of fluorescent silk solutions may be eCFP fluorescent silk, eGFP fluorescent silk, and mKate2 fluorescent silk solutions.

The present invention may be an information code created according to the above-described method.

Advantageous Effects

According to the present invention, an edible information code can be created so that the information code may be directly attached onto the food or medicine. The all-in-one product-information code allows the users to directly certificate the food or medicine to prevent the distribution of the counterfeit/altered products, thereby not only improving a level of public health such as national health and safety, but also creating the economic benefits by securing trust between the manufacturers and consumers.

The information code proposed by the present invention is created using silk produced by silkworms, that is, fibroin protein which has already been recognized as a safe material by the U.S. Food and Drug Administration so that the information code is easily digested into digestive enzymes. Therefore, there is no problem with intake. The fibroin protein (or silk) enables mass production of recombinant proteins and may be easily processed when various host systems, such as *E. coli*, yeast, plants, cultured cells, or livestock are used.

DESCRIPTION OF DRAWINGS

FIG. 1A illustrates photographs and fluorescence images of eCFP, eGFP, and mKate2 transgenic fluorescent silkworms and a silk gland of each silkworm and FIG. 1B illustrates a transgenic vector structure for the transgenic fluorescent silkworm.

FIG. 1C illustrates a comparison of photographs and fluorescence images of eCFP fluorescent silk, eGFP fluorescent silk, and mKate2 fluorescent silk, including (bare) white silk which is not transformed.

FIGS. 1D and 1E illustrate the optical absorption and fluorescence emission spectra of each fluorescent silk film which is produced using eCFP fluorescent silk (cyan), eGFP fluorescent silk (green), and mKate2 fluorescent silk (red) solutions which are reproduced, and FIG. 1F illustrates photographs and fluorescence images of three different fluorescent silk films and a white silk film using a specific set of an excitation light source and an emission optical filter.

FIG. 1G illustrates a photograph of a white silk film having a two-dimensional (2D) conical micro-grating pattern and a scanning electron microscope (SEM) image of the conical micro-pattern.

FIG. 1H illustrates a photograph of light transmission (green laser with a wavelength of 532 nm) passing through a bare white silk film and a micro-grating patterned white silk film and FIG. 1I illustrates a photograph of 7×7 matrix information codes formed on a bare white silk film and a micro-grating patterned white silk film attached onto a tablet-type medicine.

FIG. 1J illustrates transmittance spectra of a bare white silk film (black line) and a micro-grating patterned white silk film (red line).

FIG. 1K illustrates a numerical analysis result of an electric field $E_y$ distribution calculated for incident light with a wavelength of 532 nm, which is propagated to a bare white silk film and a micro-grating patterned white silk film from the air, using the finite-difference time-domain (FDTD) method.

FIG. 2A illustrates a manufacturing process of a micro-grating patterned white silk film according to an exemplary embodiment of the present invention.

FIG. 2B illustrates a method of producing an information code using a plurality of fluorescent silks including a white silk according to an exemplary embodiment of the present invention.

FIG. 2C illustrates a schematic view of an information code formed on a micro-grating patterned white silk film.

FIG. 2D illustrates top and side SEM images of a micro-grating patterned silk film on which an information code is displayed.

FIG. 2E illustrates a photograph of an information code formed on a bare white silk film without a micro-grating pattern.

FIG. 2F illustrates a photograph of an information code having various sizes and various numbers of matrices created according to an exemplary embodiment of the present invention.

FIG. 3 illustrates a photostability of a fluorescent silk film treated with alcohol to certificate alcohol-containing liquid medicines and alcoholic spirits.

FIG. 4 illustrates examples that utilize the information code according to the present invention.

FIG. 5A illustrates a photograph and a fluorescence image of an eGFP fluorescent silk film to identify a shape and an optical modification according to the elapse of time when it is immersed in pepsin (pH 2.2) and trypsin (pH 7.2) enzyme solutions which are proteinase or a buffer solution to verify whether to digest silk fibroin and fluorescent proteins.

FIG. 5B illustrates a change in fluorescence emission intensity in a wavelength of 525 nm according to a time after immersing an eGFP fluorescent silk film in a proteinase solution and a buffer solution.

FIG. 5C illustrates a red blood cell hemolysis test of various silk solutions to verify the biocompatibility of information codes.

FIG. 6A illustrates a test result of a photostability by photobleaching an information code created according to an exemplary embodiment of the present invention.

FIG. 6B illustrates a spectrum of white light used for the test of FIG. 6A and an absorption spectrum of each fluorescent silk film.

FIGS. 7A and 7B illustrate a test result of thermal stability of an information code created according to an exemplary embodiment of the present invention.

FIGS. 8A and 8B illustrate a test result of a long-term reliability of an information code created according to an exemplary embodiment of the present invention.

MODES OF THE INVENTION

Hereinafter, the exemplary embodiment is provided to just describe the present invention in more detail and it will be apparent to those skilled in the art that the scope of the present invention is not limited by the exemplary embodiments according to the gist of the present invention. It should be understood to include all changes, equivalents, or substitutes included in the spirit and the technical scope of the technology described below.

With regard to the terms used in the specification, unless the context apparently indicates otherwise, it should be understood that the terms "include" and the like indicate that a feature, a number, a step, an operation, a component, a part or the combination thereof described in the specification is present, but do not exclude a possibility of presence or addition of one or more other features, numbers, steps, operations, components, parts or combinations thereof, in advance. The terminology "and/or" includes combinations of a plurality of related elements or any one of the plurality of related elements.

When a method or an operating method is performed, respective processes/steps which constitute the method may be performed in a different order from the mentioned order unless a specific order is clearly mentioned in context. That is, the respective processes/steps may be performed in the same order as described, practically simultaneously, or an opposite order.

Only when a material which encodes digital information is edible and digestible and does not contain toxic or cytotoxic elements, the safety for ingestion may be recognized. A fiber produced by silkworms (Bombyx mori) is a silk (cocoon) and the silk is configured by sericin (20 to 30%) and fibroin (70 to 80%) proteins. In the present invention, only the fibroin protein is used. Hereinafter, even though it is disclosed as silk, fibroin, or fibroin protein, those skilled in the art know that they have the same meaning.

The fibroin (or silk) is a natural biopolymer which can be extracted from the silk cocoon without introducing heavy metals or toxicity trace elements. The fibroin has low immunogenicity and is biocompatible to minimize inflammation and immune reactions so that it is suitable as a material for edible information codes. The fibroin is currently approved for a wide range of food application fields and is also known as a generally recognized as safe substance (GRAS) by the U.S. Food and Drug Administration (FDA). Further, the fluorescent proteins are often included in genetically modified dietary products for oral ingestion. As compared with common food allergens, the fluorescent proteins do not have common allergen epitopes and are easily digested during gastric digestion. The fluorescent silk (or fluorescent fibroin) which is a genetic fusion of the fibroin and the fluorescent protein may be easily produced using a piggyBac transposase and a clustered regularly interspaced short palindromic repeats (CRISPR) tool. The fluorescent silk which is a recombinant fibroin may be massively produced with various host systems, such as Escherichia coli, yeast, plants, cultured cells, and livestock and this manufacturing method is eco-friendly, scalable, and sustainable. The fluorescent silk may be easily processed with a polymer biomaterial to manufacture various types of rigid or flexible structures with adjustable mechanical and optical properties.

All the information codes proposed by the present invention may be configured by proteins (for example, silk and fluorescent proteins) to be individually attached and incorporated into solid oral dosage type (for example, pills, tablets, or capsules) medicines, alcoholic spirits, foods, and the like. Various unique fluorescence emission colors may improve an encoding capacity and attack (counterfeit/altered) resistance. The emitted fluorescence color may be sensed only by a unique set of an excitation light source and an emission optical filter.

FIG. 1A illustrates photographs and fluorescence images of eCFP, eGFP, and mKate2 transgenic fluorescent silkworms and a silk gland of each silkworm and FIG. 1B illustrates a transgenic vector structure for the transgenic fluorescent silkworms.

The fluorescent silkworms (eCFP, eGFP, and mKate2 fluorescent silkworms) of FIG. 1A may be produced by a generic fusion process of fibroin (or silkworm) and a fluorescent protein. A type of fluorescent protein includes an enhanced cyan fluorescent protein (eCFP), an enhanced green fluorescent protein (eGFP), a far-red fluorescent protein (mKate2), and the like. However, it is not limited thereto. The eCFP fluorescent silk, the eGFP fluorescent silk, and the mKate2 fluorescent silk solutions and the corresponding films have cyan (or blue green), green, and red fluorescence emission colors and each requires a specific set of optical excitation and emission bands in the visible wavelength range. In FIG. 1, wavelengths of an excitation light source $\lambda_{ex}$ and an optical emission filter $\lambda_{em}$ for each fluorescent silk are as follows. For the eCFP fluorescent silk, $\lambda_{ex}$ is 415 nm and $\lambda_{em}$ is 460 nm, For the eGFP fluorescent silk, $\lambda_{ex}$ is 470 nm and $\lambda_{em}$ is 525 nm, and For the mKate2 fluorescent silk, $\lambda_{ex}$ is 530 nm and $\lambda_{em}$ is 630 nm.

The transgenic fluorescent silkworms of FIG. 1A may be produced by the following process.

First, a plasmid vector DNA is constructed for the silkworm transgenesis. Specifically, in order to produce the transgenic silkworms, a piggyBac transposon method is used to construct transfer vectors p3×P3-DsRed2-pFibH-eCFP, p3×P3-DsRed2-pFibH-eGFP, and p3×P3-eGFP-pFibH-mKate2 for piggyBac-derived vectors. A transfer vector including a helper vector is injected into a silkworm pre-blastoderm embryo. In order to construct the plasmid, a marker DsRed2 cDNA (eGFP cDNA for mKate2) is amplified by a polymerase chain reaction (PCR) using a specific primer with NheI/AflII sites from pDsRed2-C1 (NheI-DsRed2-F: 5'-GCTAGCATGGCCTCCTCCGAGAAC-3' (SEQ ID NO: 1) and DsRed2-AflII-R: 5'-CTTAAGCTACAGGAACAGGTGGTGGCG-3' (SEQ ID NO: 2), Clontech, Mountain View, CA, USA) and is cloned into the pGEM-T Easy vector system (Promega Co., Madison, WI, USA), designated by pGEMT-DsRed2 (pGEMT-eGFP for mKate2). A DsRed2 gene is excised from pGEMT-DsRed2 digested with a restriction enzyme of NheI/AflII and is replaced by the eGFP gene of p3×P3-eGFP to form p3×P3-DsRed2 for the eCFP and eGFP (p3×P3-eGFP for mKate2). A DNA fragment, which contains a promoter domain (1,124 base pairs (bp)) and an N-terminal region (1,430 bp) including an intron (972 bp) of a fibroin heavy (H) chain gene (GenBank Accession No. AF226688, nt. 61312-63870) and is amplified by PCR using the genomic DNA from Bombyx mori and primers (pFibHN-F: 5'-GGCGCGCCGTGCGTGATCAGGAAAAAT-3' (SEQ ID NO: 3) and pFibHN-R: 5'-TGCACCGACTGCAGCACTA GTGCTGAA-3' (SEQ ID NO: 4)) and a genome DNA of Bombyx mori. The resultant DNA fragment is cloned into a pGEM-T Easy Vector System, named as pGEMT-pFibH-NTR. The DNA fragment including 180 bp of the 3' terminal sequence of the fibroin H-chain gene open reading frame and additional 300 bp of a 3' region of the fibroin H-chain gene (GenBank Accession No AF226688, nt.79021-80009) is amplified by PCR using genomic DNA from Bombyx mori and primers (pFibHC-F: 5'-AGCGTCAGTTACG GAGCTGGCAGGGGA-3' (SEQ ID NO: 5) and pFibHC-R: 5'-TATAGTATTCTTAGTTGAGAAGGCATA-3' (SEQ ID NO: 6)). The resultant DNA fragment is cloned into the pGEM-T Easy Vector System, named as pGEMT-CTR. To prepare fragments, pGEMT-pFibH-NTR is digested with AscI/BamHI and pGEMT-CTR is digested with SalI/FseI, respectively. Two fragments are cloned into pBluescriptII SK(-) vector (Stratagene, CA, USA) digested with ApaI/SalI to produce pFibHNC-null. Genes of eCFP, eGFP, and mKate2 are synthesized, respectively. The eCFP, eGFP, and mKate2 genes may be purchased from BIONEER (Daejeon, KOREA). The N-terminal and C-terminal have NotI and SbfI restriction sites, respectively. Fragments of the eCFP, eGFP, and mKate2 genes without a termination codon are amplified from peGFP-1 (Clontech) using primers eGFP-F: 5'-GCGGCCGCATGGTGAGCAAGGGCGAGGAG-3' (SEQ ID NO: 7) and eGFP-R: 5'-GCTGAGGCTTGTA-CAGC TCGTCCAT-3' (SEQ ID NO: 8)) and are cloned into the pGEM-T Easy Vector. The resultant fragment is digested with NotI/BbvcI and then cloned into pFibHNC-null digested with NotI/BbvcI, resulting in pFibHNC-eCFP, pFibHNC-eGFP, or pFibHNC-mKate2. Each vector of pFibHNC-eCFP, pFibHNC-eGFP, and pFibHNC-mKate2 is digested with AscI/FseI and is subcloned into p3×P3-DsRed2 (p3×P3-eGFP for mKate2). The resultant vectors may be named as p3×P3-DsRed2-pFibH-eCFP, p3×P3-DsRed2-pFibH-eGFP, and p3×P3-eGFP-pFibH-mKate2, respectively. That is, the fluorescent protein gene, that is, eCFP fluorescent silk, eGFP fluorescent silk, and mKate2 fluorescent silk as in FIG. 1B are produced by fusion of p3×P3-DsRed2-pFibH-eCFP, p3×P3-DsRed2-pFibH-eGFP, and p3×P3-cGFP-pFibH-mKate2 transgenic vectors with N-terminal and C-terminal domains of the fibroin H-chain promotor (pFibH). The eCFP fluorescent silk/eGFP fluorescent silk/mKate2 fluorescent silk may be constructed by a fibroin H-chain promotor domain (pFibH, 1124 base pairs (bp)), a N-terminal region 1 (NTR-1, 142 bp), an intron (871 bp), the N-terminal region 2 (NTR-2, 417 bp), a C-terminal region (CTR, 179 bp), a polyA signal region (301 bp), an enhanced cyan fluorescent protein (eCFP, 720 bp), an enhanced green fluorescent protein (eGFP, 720 bp), a red fluorescent protein (mKate2, 699 bp), inverted repeat sequences of piggyBac arms (ITR), 3×P3 promoter (273 bp), and Sv40 polyadenylation signal sequence (Sv40 pA, 268 bp). The DsRed2 far-red fluorescent protein is used only for marker genes of eCFP and eGFP and eGFP may be used for a marker gene of mKate2.

FIG. 1C illustrates comparison of photographs and fluorescence images of eCFP fluorescent silk, eGFP fluorescent silk, and mKate2 fluorescent silk, including (bare) white silk which is not transformed. Each silk solution may be reproduced from the corresponding silk.

The fluorescent silk may be refined and reproduced at a predetermined temperature. The predetermined temperature is a temperature for avoiding the protein denaturation of the fluorescent silk due to the heat and for example, 50° C. or lower.

For effective refining, the silk cocoons may be treated several times in 0.2% sodium bicarbonate (NaHCO$_3$) or sodium carbonate (Na$_2$CO$_3$) solution under a pressure of 620 mmHg. The refined silk cocoons are washed several times with deionized water and then naturally dried in a dark room.

After cutting the silk cocoons into a predetermined size (for example, 2 to 5 mm), the silk pieces are completely dissolved in 9.5 M lithium bromide aqueous solution at a predetermined temperature for a predetermined time (for example, 8 to 12 hours) while stirring at a predetermined speed (for example, 300 to 400 rpm). As other dissolving agents, hydrochloric acid aqueous solution or calcium chloride/ethanol/water-mixed aqueous solution may be included. The dissolved silk solution is filtered through a miracloth filter. In order to completely remove the dissolving agent, the filtered solution is dialyzed with the deionized water into a cellulose semipermeable tube or cassette at a room temperature for a predetermined time or longer (for example, two days or longer) while exchanging the deionized water several times. By doing this, eCFP fluorescent silk, eGFP fluorescent silk, and mKate2 fluorescent silk solutions with a final concentration of 5 to 6% (w/v) may be produced.

FIGS. 1D and 1E illustrate optical absorption and fluorescence emission spectra of each fluorescent silk film which is produced using eCFP fluorescent silk (cyan), eGFP fluorescent silk (green), and mKate2 fluorescent silk (red) solutions which are reproduced, and FIG. 1F illustrates photographs and fluorescence images of three different fluorescent silk films and white silk film using a specific set of an excitation light source and an emission optical filter. Wavelengths of an excitation light source $\lambda_{ex}$ and an emission optical filter $\lambda_{em}$ for each fluorescent silk are as follows. For the eCFP fluorescent silk, $\lambda_{ex}$ is 415 nm and $\lambda_{em}$ is 460 nm, for the eGFP fluorescent silk, $\lambda_{ex}$ is 470 nm and $\lambda_{em}$ is 525 nm, and for the mKate2 fluorescent silk, $\lambda_{ex}$ is 530 nm and $\lambda_{em}$ is 630 nm. An average thickness of the silk film is 70 μm.

FIG. 1G illustrates a photograph of a white silk film having a two-dimensional (2D) conical micro-grating pattern and a scanning electron microscope (SEM) image of the conical micro-pattern. Referring to FIG. 1G, the conical micro-grating may be configured with a hexagonal pattern. A height of a conical grating and a diameter of a bottom surface are 1.4 and 2.7 μm, respectively and a distance between adjacent gratings (that is, an interval) is 2.9 μm.

FIG. 1H illustrates a photograph of light transmission (green laser with a wavelength of 532 nm) passing through a bare white silk film and a micro-grating patterned white silk film and FIG. 1I illustrates a photograph of 7×7 matrix information codes of a bare white silk film (left) and a micro-grating patterned white silk film (right) attached onto a tablet medicine. A shape (array) of the micro-grating pattern is designed to produce strong optical diffraction (that is, light scattering). It is difficult to identify a matrix size, number, and distribution of the information code formed on the micro-grating patterned silk film with the naked eye because light is strongly diffracted due to the micro-grating.

FIG. 1J illustrates transmittance spectra of a bare white silk film (black line) and a micro-grating patterned white silk film (red line). In the micro-grating patterned silk film, the incident light is scattered without maintaining directivity due to the optical diffraction, but in the bare white silk film, the light goes straight without angular spread.

FIG. 1K illustrates a numerical analysis result of an electric field $E_y$ distribution calculated for incident light with a wavelength of 532 nm which is propagated to a bare white silk film (left) and a micro-grating patterned white silk film (right) from the air. The simulation for numerical analysis is performed using the finite-difference time-domain (FDTD) method. It was confirmed from the experiment result that the electric field distribution of the strong light diffraction caused by the conical micro-grating patterned on a white silk film hides the information code, ensuring the confidentiality of the information code.

FIG. 2A illustrates a manufacturing process of a micro-grating patterned white silk film according to an exemplary embodiment of the present invention.

According to the exemplary embodiment, the white silk film may be patterned with a micro-grating array using a soft imprint lithography to achieve the invisibility of the information code. Matrix details (shape, pattern, size, number, and the like) of the information code are not exposed due to the blurriness of the film (optical diffraction) so that even though the information code is attached onto the food or medicine, the security of the information code may be maintained and the user's resistance may be reduced.

In order to produce the white silk film, a PDMS (polydimethylsiloxane) stamp with a reciprocal grating pattern may be coated with a white silk solution. The PDMS template may be used as a stamp which transmits a grating pattern in a conical micro-grating patterned sapphire substrate.

After drying the coated white silk solution, the film may be separated from the PDMS stamp. The resultant white silk film may have a grating pattern which inversely corresponds to the PDMS stamp.

A size of the white silk film varies depending on the amount of information so that the grating pattern may be designed to have various shapes and patterns to create strong diffraction from a visible ray. When the size is small, the grating pattern may be referred to as a micro-grating pattern.

FIG. 2B illustrates a method of producing an information code using a plurality of fluorescent silks including a white silk according to an exemplary embodiment of the present invention.

The information code according to the exemplary embodiment of the present disclosure may be created using a white silk film. For example, the white silk film may be a thin white silk film with a micro-grating pattern created in FIG. 2A, but it does not necessarily have the micro-grating pattern. The white silk film may also be non-fluorescent, but is not limited thereto. The information code may be a multi-dimensional fluorescent code, that is, having a plurality of fluorescent colors.

Specifically, in order to display a plurality of multi-dimensional codes with different fluorescence emission colors on the white silk film, a plurality of different matrix code patterns (or masks) having a predetermined opening so as to correspond to each dimension (or color) of the information code may be used. For example, the plurality of matrix code patterns may be produced so as to correspond to the eCFP fluorescent silk, eGFP fluorescent silk, or mKate2 fluorescent silk solution. A matrix code pattern of a non-fluorescent white silk solution may be also added to have a separate signal.

Each fluorescent silk solution is filled in the opening to be sequentially coated on a flat surface of the white silk film by a doctor blade method. Each opening pattern may correspond to each dimension of the information code. For example, an 80 μm-thick vinyl mask with four different opening patterns is prepared by Circuit Explore®Air 2 cutter (Cricut, Inc., South Jordan, UT, USA) and is sequentially coated using eCFP fluorescent silk, eGFP fluorescent silk, and mKate2 fluorescent silk solutions so as not to overlap the matrix code patterns. Further, a matrix code pattern may be further added using a white silk solution.

After coating, the sample is hardened in the dark room. The coating process may be repeated several times. When the mask (or matrix code pattern) is removed after drying, a final information code proposed by the present invention may be created.

However, the thickness and the size of the mask and a size of a matrix array representing an information code which have been described above are just an example, but the present invention is not limited thereto.

FIG. 2C illustrates a schematic view of an information code formed on a micro-grating patterned white silk film. The information may be attached onto foods, medicines, or inside a bottle of alcoholic spirits to locate the micro-grating pattern on an outermost layer.

FIG. 2D illustrates top and side (bottom) SEM images of a micro-grating patterned silk film on which an information code is displayed. In FIG. 2D, an average size and a thickness of the information code configured by the fluorescent silk film may be 700×700 μm$^2$ and 70 μm, respectively, but are not limited thereto.

FIG. 2E illustrates a photograph of an information code formed on a bare white silk film without a micro-grating pattern. The information code formed on the bare white silk film without light diffraction (scattering) allows a matrix pattern and a size to be identified with the naked eye, but the type of the fluorescent silk (for example, white, eCFP, eGFP, or mKate2) cannot be distinguished so that the information code using the fluorescent material may improve the information security.

FIG. 2F illustrates a photograph of an information code having various sizes and various numbers of matrices created according to an exemplary embodiment of the present invention.

Referring to FIG. 2F, the size of the information code may vary depending on the number of matrices (arrays) of the information code. For example, the information code may be included in a taggant (tag) size of 7×7 mm$^2$, 9×9 mm$^2$, or 11×11 mm$^2$, and an encoding capacity may vary depending on the size of the information code. The encoding capacity $c^s$ is defined by the number of output codes and responses which may be output by the input pattern and c indicates bits (in the case of binary bit, c=2) and s indicates a key size.

A size of the information code may be changed by controlling the number of codes so that in the case of 5×5 matrix information code, each fluorescent color code has 25 binary bits and is configured by three fluorescent color codes. Therefore, an encoding capacity of 5×5 matrix information code is $2^{75}$ (=3.77×10$^{22}$), an encoding capacity of 7×7 matrix information code is $2^{147}$ (=1.78×10$^{44}$), and an encoding capacity of 9×9 matrix information code is $2^{243}$ (=1.41×10$^{73}$). In an individual square code size of 700×700 μm2, sizes of 5×5, 7×7, and 9×9 matrix information codes may be 7×7, 9×9, and 11×11 mm$^2$.

Hereinafter, a test result to confirm whether the information code created according to the exemplary embodiment of the present invention is applicable to a liquid product is illustrated.

FIG. 3 illustrates a photostability of a fluorescent silk film treated with alcohol to certificate alcohol-containing liquid medicines and alcoholic spirits.

Specifically, FIG. 3 is a photograph and a fluorescence image of eGFP fluorescent silk film immersed in an ethanol solution at various concentrations of 0 to 99% (vv$^{-1}$) for 10 months. Since the silk film is extensively treated with alcohol to improve optical and mechanical characteristics, the test is mainly focused on application of alcohol-containing medicines and high-end alcoholic spirits. That is, the alcohol (that is, ethanol) is often a common ingredient of liquid-formulated medicines (for example, syrups, solutions, and emulsions). In fact, some liquid medicine contains a high level of alcohol. With regard to this, we tested morphological and luminescent properties of the eGFP fluorescent silk film in 200 proof (99.5%) ethanol solution at various concentrations and exposure periods. The eGFP fluorescent silk film, which emitted fluorescence, expanded in water (0% ethanol solution) and 10%-ethanol solution due to the formation of a new hydrogen bond. In contrast, the eGFP fluorescent silk film did not show any significant change in the shape or fluorescent emission with respect to the ethanol solution with a concentration of 20% or higher ($vv^{-1}$) even after 10 months. This is because the crystallinity is increased as the random coil (that is, silk I) is converted to β (beta) sheet (that is, silk II). Accordingly, the information code created according to the exemplary embodiment of the present invention may be applied to liquid medicines or alcoholic spirits containing a high alcohol content (>20%) for in-dose authentication.

FIG. 4 illustrates examples that utilize the information code according to the present invention.

A left drawing is an authentication photograph of a medicine attached (or integrated) with an information code according to the present invention and a right drawing is an authentication photograph of an alcoholic spirit (for example, a scotch whisky bottle, 80 proof, 40%-alcohol) including an information code according to the present invention.

Hereinafter, a result of evaluating a digestive-enzymatic decomposition rate of an information code created according to an exemplary embodiment of the present invention is shown. Specifically, in order to evaluate the digestibility of the information code according to the present invention, the possibility of enzymatic degradation of a fluorescent silk film in vitro was investigated in an environment similar to the human body using two major proteolytic enzymes produced in the gastrointestinal tract.

FIG. 5A illustrates a photograph and a fluorescence image of an eGFP fluorescent silk film to identify a shape and optical modification according to the elapse of time when it is immersed in pepsin (pH 2.2) and trypsin (pH 7.2) enzyme solutions which are proteinase or buffer solutions (pH 2.2 and pH 7.2) to verify whether to digest silk fibroin and fluorescent protein.

For comparison, the test was performed along with a buffer solution having the same pH value without enzyme. The dietary protein digestion includes denaturation (that is, protein unfolding) and degradation (that is, destruction of primary structures). Pepsin produced in the stomach denatures food proteins with non-specific proteases in a highly acidic environment, and trypsin produced in the pancreas is released into the small intestine to further digest proteins at a neutral pH level. An accurate protein sequence is required to form a chromophore to quantify protein denaturation and degradation, and the eGFP fluorescent protein may be a reliable marker because it is sensitive to even subtle denaturation.

FIG. 5B illustrates a change in fluorescence emission intensity in a wavelength of 525 nm according to a time after immersing an eGFP fluorescent silk film in a proteinase solution and a buffer solution.

The eGFP fluorescent silk films (size=9×9 $mm^2$) were submerged in 0.1% pepsin (pH 2.2) and 0.25% trypsin (pH 7.2) solutions, respectively. The protein denaturation and degradation of information codes were monitored by identifying whether the eGFP fluorescence intensity (a wavelength of 525 nm) emitted from an area of 15×15 $mm^2$ decreased. For 60 minutes, in enzyme-free control groups (pH 2.2 and pH 7.2 buffer solutions), there was no change in the fluorescence emission of the eGFP fluorescent silk film, but its shape changed, showing significant expansion and distortion. In contrast, it was confirmed that during the same period, in the eGFP fluorescent silk film which was exposed to two enzymes, the fluorescence intensity was significantly reduced and the shape disappeared. In addition, a reduction rate of the fluorescence intensity of the eGFP fluorescent silk film exposed to pepsin was approximately 1.6 times faster than that of trypsin after 60 minutes (a p-value of ANOVA test≈0).

In FIG. 5B, the fluorescence intensity was normalized with an initial value (0 minute). The rapid decrease of the fluorescence intensity of the eGFP fluorescent silk film indicated the progression of denaturation and degradation of the protein-based information code. The enzyme degradation test was repeated four times and an error bar indicated a standard deviation.

FIG. 5C illustrates a red blood cell hemolysis test of various silk solutions to verify the biocompatibility of information codes.

In order to evaluate a biological stability (biocompatibility) of constituent materials of the information code created according to the exemplary embodiment of the present invention, a standard hemolysis test of white silk and fluorescent silk solutions with a concentration of 5 to 6% (w/v) was performed using red blood cells of a sheep. For comparison, 0.1% TritonX-100 and phosphate-buffered saline (PBS) without a silk solution were used as positive (100% of hemolysis efficiency) and negative (0%) control groups, respectively. The positive control group (0.1% TritonX-100) showed a clear red color due to a uniform breakdown of the red blood cells, but the silk solution and the negative control group (PBS) showed a pale-yellow color.

The hemolysis efficiency (%) is defined as follows.

$$\text{Hemolysis efficiency (\%)} = (AS - AN)/(AP - AN) \times 100$$

Here, AS, AP, and AN indicate absorption values of the silk solution, the positive control group, and the negative control group at a wavelength of 580 nm, respectively.

Referring to FIG. 5C, it was confirmed that the hemolysis efficiencies of four silk solutions were not statistically different from that of the negative control group (a p-value of ANOVA test is 0.16). The image included in FIG. 5C illustrates a hemolysis test result of representative samples using red blood cells of a sheep.

Hereinafter, a result of verifying a performance of an information code created according to an exemplary embodiment of the present invention will be described.

FIG. 6A illustrates a test result of a photostability by photobleaching an information code created according to an exemplary embodiment of the present invention.

For the photostability test of the information code, a CIE standard light source having a color temperature of 6500 K (also referred to as D65) which imitates daylight was used. The CIE standard light source may be an LED light source.

FIG. 6A illustrates a fluorescent emission intensity of a fluorescent silk film in accordance with the elapse of time under the LED light source. The fluorescent emission intensity was normalized with a value before irradiating the illumination at a maximum emission peak of each fluorescent silk film. A maximum emission peak of the eCFP fluorescent silk film was 485 nm, a maximum emission peak of the eGFP fluorescent silk film was 525 nm, and a maximum emission peak of the mKate2 fluorescent film was 625 nm. It was confirmed that the fluorescent silk films maintained 80% or more of fluorescence intensity even after elapse of 200 hours.

FIG. 6B illustrates a spectrum of white light used for the test of FIG. 6A and an absorption spectrum of each fluorescent silk film.

FIG. 6B illustrates an illumination spectrum of a CIE standard LED light source with a color temperature of 6500 K used for accelerated photobleaching experiments of the eCFP fluorescent silk, the eGFP fluorescent silk, and the mKate2 fluorescent silk films and absorption spectrum. The LED light source covers an absorption wavelength range of all the fluorescent silk films and has a high illuminance of 5000 lux which is 10 times higher than a recommended office workspace illumination intensity (that is, 500 lux). Accordingly, if a packaging material treated with chemicals having a light-blocking function is used, an expiration date of the fluorescent silk film may be significantly extended.

FIGS. 7A and 7B illustrate a test result of the thermal stability of an information code created according to an exemplary embodiment of the present invention.

FIG. 7A illustrates a fluorescent emission intensity of the fluorescent silk film in accordance with the change in temperature. The fluorescent emission intensity was normalized as a fluorescent emission intensity at 23° C. (room temperature) as compared with a maximum emission peak of each fluorescent silk film. Here, a maximum emission peak of the eCFP fluorescent silk film is 485 nm, a maximum emission peak of the eGFP fluorescent silk film is 525 nm, and a maximum emission peak of the mKate2 fluorescent film is 625 nm. The photograph and the fluorescent image attached to the graph of each fluorescent silk film are a representative photograph and a fluorescence image of the fluorescent silk film at temperatures of 23° C. and 90° C., respectively.

FIG. 7B illustrates a bit error rate of an output key extracted from an information code created according to an exemplary embodiment of the present invention using an excitation (λ light source and emission (λ optical filter in accordance with the change in temperature. The information code created according to an exemplary embodiment of the present invention was put in an oven for three hours to be thermally treated at different temperature ranges of 30 to 90° C.

Referring to FIGS. 7A and 7B, when the eCFP fluorescent silk, the eGFP fluorescent silk, and the mKate2 fluorescent silk films were exposed to temperatures of 65, 65, and 60° C. or lower, respectively, their fluorescence intensity was maintained to 80% or more and the bit error rate was 0% so that the information code showed an excellent thermal stability. Thickness and diameter of the eCFP fluorescent silk, the eGFP fluorescent silk, and the mKate2 fluorescent silk films used in this test were 70 μm and 13 mm, respectively.

FIGS. 8A and 8B illustrate a test result of a long-term reliability of an information code created according to an exemplary embodiment of the present invention.

FIG. 8A is an image when a raw information code is obtained after 360 days and FIG. 8B is an output authentication code extracted from FIG. 8A. In order to obtain FIGS. 8A and 8B, the same excitation ($\lambda_{ex}$) light source and emission ($\lambda_{em}$) optical filter were used. Specifically, as the excitation light source and emission optical filter, for the eCFP fluorescent silk film (blue green or cyan), $\lambda_{ex}$=415 nm/$\lambda_{em}$=460 nm, for the eGFP fluorescent silk film (green), $\lambda_{ex}$=470 nm/$\lambda_{em}$=525 nm, and for the mKate2 fluorescent silk film (red), $\lambda_{ex}$=530 nm/$\lambda_{em}$=630 nm. The raw information code was stored in a dark ambient environment (that is, 23±2° C. and 30 to 40% relative humidity).

As a result of comparing an output authentication code extracted from an image that the raw information code was obtained after 360 days and an output authentication code extracted from the raw information code, the code bit error rate was 0.

Although the specific part of the present invention has been described in detail, it is obvious to those skilled in the art that such a specific description is just a preferred embodiment, and the scope of the present invention is not limited thereby. Thus, the substantial scope of the present invention will be defined by the appended claims and equivalents thereof.

---

The invention claimed is:

1. A method for creating an information code configured by a silk film, comprising:
   a process of creating a white silk film; and
   a process of coating the white silk film with each of a plurality of fluorescent silk solutions in a corresponding position of an information code,
   wherein the information code is configured by a colors corresponding to the each of the plurality of fluorescent silk solutions and a white color.

2. The method for creating an information code configured by a silk film of claim 1, wherein the white silk film is a white silk film with a grating pattern.

3. The method for creating an information code configured by a silk film of claim 2, wherein the process of creating a white silk film includes:
   a process of coating a polydimethylsiloxane stamp having the grating pattern with a white silk solution;
   a process of drying the coated white silk solution; and
   a process of separating the dried white silk film from the polydimethylsiloxane stamp.

4. The method for creating an information code configured by a silk film of claim 1, wherein the process of coating the white silk film with each of a plurality of fluorescent silk solutions comprises:
   a first process of covering the white silk film with a mask corresponding to one of the plurality of fluorescent silk solutions;
   a second process of coating the white silk film with one fluorescent silk solution of the plurality of fluorescent silk solutions;
   a third process of drying the coated fluorescent silk solution;
   a fourth process of separating the mask from the dried fluorescent silk film; and
   a process of performing the first to fourth processes on each of the plurality of fluorescent silk solutions.

5. The method for creating an information code configured by a silk film of claim 1, further comprising:
   a process of coating a white silk solution in the corresponding position of the information code.

6. The method for creating an information code configured by a silk film of claim 1, wherein each fluorescent silk solution is a solution created by cutting each fluorescent silk to a predetermined size, stirring the cut silk pieces at a predetermined speed to be dissolved in an aqueous solution including a dissolving agent at a predetermined temperature for a predetermined time.

7. The method for creating an information code configured by a silk film of claim 6, wherein each fluorescent silk solution is a solution created by filtering the dissolved solution using a miracloth filter and exchanging deionized water several times while dialyzing into a cellulose semipermeable tube to adjust each fluorescent silk solution to a predetermined concentration.

8. The method for creating an information code configured by a silk film of claim 1, wherein the plurality of fluorescent silk solutions is eCFP fluorescent silk, eGFP fluorescent silk, and mKate2 fluorescent silk solutions.

9. An information code created according to the method of claim 1.

* * * * *

SEQUENCE LISTING

```
Sequence total quantity: 8
SEQ ID NO: 1            moltype = DNA  length = 24
FEATURE                 Location/Qualifiers
source                  1..24
                        mol_type = other DNA
                        note = NheI-DsRed2-F
                        organism = Synthetic construct
SEQUENCE: 1
gctagcatgg cctcctccga gaac                                          24

SEQ ID NO: 2            moltype = DNA  length = 27
FEATURE                 Location/Qualifiers
source                  1..27
                        mol_type = other DNA
                        note = DsRed2-AflII-R
                        organism = Synthetic construct
SEQUENCE: 2
cttaagctac aggaacaggt ggtggcg                                       27

SEQ ID NO: 3            moltype = DNA  length = 27
FEATURE                 Location/Qualifiers
source                  1..27
                        mol_type = other DNA
                        note = pFibHN-F
                        organism = Synthetic construct
```

```
SEQUENCE: 3
ggcgcgccgt gcgtgatcag gaaaaat                                              27

SEQ ID NO: 4            moltype = DNA  length = 27
FEATURE                 Location/Qualifiers
source                  1..27
                        mol_type = other DNA
                        note = pFibHN-R
                        organism = Synthetic construct
SEQUENCE: 4
tgcaccgact gcagcactag tgctgaa                                              27

SEQ ID NO: 5            moltype = DNA  length = 27
FEATURE                 Location/Qualifiers
source                  1..27
                        mol_type = other DNA
                        note = pFibHC-F
                        organism = Synthetic construct
SEQUENCE: 5
agcgtcagtt acggagctgg cagggga                                              27

SEQ ID NO: 6            moltype = DNA  length = 27
FEATURE                 Location/Qualifiers
source                  1..27
                        mol_type = other DNA
                        note = pFibHC-R
                        organism = Synthetic construct
SEQUENCE: 6
tatagtattc ttagttgaga aggcata                                              27

SEQ ID NO: 7            moltype = DNA  length = 29
FEATURE                 Location/Qualifiers
source                  1..29
                        mol_type = other DNA
                        note = eGFP-F
                        organism = Synthetic construct
SEQUENCE: 7
gcggccgcat ggtgagcaag ggcgaggag                                            29

SEQ ID NO: 8            moltype = DNA  length = 25
FEATURE                 Location/Qualifiers
source                  1..25
                        mol_type = other DNA
                        note = eGFP-R
                        organism = Synthetic construct
SEQUENCE: 8
gctgaggctt gtacagctcg tccat                                                25
```